(12) United States Patent
Urban et al.

(10) Patent No.: US 11,119,011 B2
(45) Date of Patent: Sep. 14, 2021

(54) METHOD FOR EXTRACTING AND DETECTING VOLATILE ORGANIC COMPOUNDS

(71) Applicant: NATIONAL TSING HUA UNIVERSITY, Hsinchu (TW)

(72) Inventors: Pawel Lukasz Urban, Hsinchu (TW); Decibel P. Elpa, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 198 days.

(21) Appl. No.: 16/273,336

(22) Filed: Feb. 12, 2019

(65) Prior Publication Data

US 2020/0256770 A1 Aug. 13, 2020

(51) Int. Cl.
*G01N 1/22* (2006.01)
*G01N 30/72* (2006.01)
(Continued)

(52) U.S. Cl.
CPC ....... *G01N 1/2226* (2013.01); *G01N 30/7206* (2013.01); *G01N 2001/002* (2013.01);
(Continued)

(58) Field of Classification Search
CPC ......... G01N 1/2226; G01N 2001/2229; G01N 2001/2267; G01N 2001/002; G01N 30/7206; G01N 2030/009
See application file for complete search history.

(56) References Cited

U.S. PATENT DOCUMENTS 4,266,950 A * 5/1981 Makino .............. B01D 19/0052
261/121.1
4,546,640 A * 10/1985 Stone .................... E21B 49/005
73/152.19
(Continued)

FOREIGN PATENT DOCUMENTS

CN 101509893 A * 8/2009 ............. G01N 27/62
CN 104129829 A 11/2014
(Continued)

OTHER PUBLICATIONS

Machine translation of CN109621924A (Year: 2019).*
(Continued)

*Primary Examiner* — Natalie Huls
(74) *Attorney, Agent, or Firm* — McClure, Qualey & Rodack, LLP

(57) ABSTRACT

A method for extracting and detecting volatile organic compounds includes steps as follows. At least one effervescent tablet is provided, wherein the effervescent tablet is produced by mixing an acidic compound and an alkaline compound homogeneously. An extraction and detection apparatus is provided, wherein the extraction and detection apparatus includes an extraction chamber, an injection tube and a detection instrument. An extraction step is performed, wherein a liquid matrix is put into the extraction chamber, and the effervescent tablet is added into the liquid matrix to generate bubbles, the volatile organic compounds are extracted from the liquid matrix by the bubbles, and the bubbles enter into the headspace of the extraction chamber. A detection step is performed, wherein the volatile organic compounds extracted during the extraction step are transferred to the detection instrument via the injection tube so as to detect the volatile organic compounds.

2 Claims, 17 Drawing Sheets

(51) Int. Cl.
    *G01N 30/00* (2006.01)
    *G01N 1/00* (2006.01)
(52) U.S. Cl.
    CPC ............... *G01N 2001/2229* (2013.01); *G01N 2001/2267* (2013.01); *G01N 2030/009* (2013.01)

(56) References Cited

U.S. PATENT DOCUMENTS

| | | | | |
|---|---|---|---|---|
| 4,587,834 | A * | 5/1986 | Fisher | G01N 30/56 |
| | | | | 436/161 |
| 5,127,259 | A * | 7/1992 | Kahl | G01N 1/4055 |
| | | | | 73/19.1 |
| 5,222,032 | A * | 6/1993 | Fleming | G01N 33/1826 |
| | | | | 700/271 |
| 5,258,057 | A * | 11/1993 | Baykut | B01D 11/04 |
| | | | | 95/263 |
| 5,614,089 | A * | 3/1997 | Allington | B01D 11/0203 |
| | | | | 210/198.2 |
| 9,983,182 | B2 * | 5/2018 | Chen | G01N 1/4055 |
| 2009/0188299 | A1 * | 7/2009 | Komura | G01N 1/2226 |
| | | | | 73/23.41 |
| 2012/0095208 | A1 | 4/2012 | Park et al. | |
| 2013/0045934 | A1 | 2/2013 | Tsuji et al. | |
| 2016/0320354 | A1 * | 11/2016 | Cretnik | G01N 1/2226 |
| 2017/0052191 | A1 * | 2/2017 | Basheer | G01N 30/06 |
| 2019/0031532 | A1 | 1/2019 | Bermudes | |

FOREIGN PATENT DOCUMENTS

| | | | | |
|---|---|---|---|---|
| CN | 109621924 | A * | 4/2019 | ............ G01N 30/06 |
| TW | 201204449 | A1 | 2/2012 | |

OTHER PUBLICATIONS

Machine translation of CN101509893A (Year: 2016).*

Qizhen Wei et al., "Tablet-effervescence-assisted dissolved carbon flotation for the extraction of four triazole fungicides in water by gas chromatography with mass spectrometry", Journal of Separation Science, published in Dec. 2016, vol. 39, issue 23, pp. 4603-4609, published by Wiley-VCH, Germany.

S. Camou et al., "ppb-Level detection of benzene diluted in water with portable device based on bubbling extraction and UV spectroscopy", Sensors and Actuators B: Chemical, published on Jun. 16, 2008, vol. 132, issue 2, pp. 601-607, published by Elsevier B.V., Netherlands.

Cheng-Hao Chang et al., "Fizzy Extraction of Volatile and Semivolatile Compounds into the Gas Phase", Analytical Chemistry, published on Sep. 6, 2016, vol. 88, issue 17, pp. 8735-8740, published by American Chemical Society, United States.

Konstantin Chingin et al., "Simultaneous Preconcentration and Desalting of Organic Solutes in Aqueous Solutions by Bubble Bursting", Analytical Chemistry, published on May 17, 2016, vol. 88, issue 10, pp. 5033-5036, published by American Chemical Society, United States.

Catalina Espino Devine et al., "Development and Testing of a Field Screening Method Based on Bubbling Extraction and Photoionization Detection for Measurement of Benzene and Total VOCs", Groundwater Monitoring & Remediation, Published in 2014, vol. 34, issue 3, pp. 95-104, published by Wiley Periodicals, Inc., United States.

Mitsuya Shimoda et al., "Extraction of Volatile Compounds from Aqueous Solution using Micro Bubble, Gaseous, Supercritical and Liquid Carbon Dioxide", Journal of Food Science, published in Jan. 1994, vol. 59, issue 1, pp. 231-233, published by John Wiley & Sons, Inc., United States.

Guillermo Lasarte-Aragonés et al., "Effervescence-assisted dispersive micro-solid phase extraction", Journal of Chromatography A, published on Dec. 23, 2011, vol. 1218, issue 51, pp. 9128-9134, published by Elsevier B.V., Netherlands.

Guillermo Lasarte-Aragonés et al., "Effervescence-assisted carbon nanotubes dispersion for the micro-solid-phase extraction of triazine herbicides from environmental waters", Analytical and Bioanalytical Chemistry, published in Apr. 2013, vol. 405, issue 10, pp. 3269-3277, published by Springer-Verlag, Germany.

Guillermo Lasarte-Aragonés et al., "Effervescence assisted dispersive liquid-liquid microextraction with extractant removal by magnetic nanoparticles", Analytica Chimica Acta, published on Jan. 7, 2014, vol. 807, pp. 61-66, published by Elsevier B.V., Netherlands.

* cited by examiner

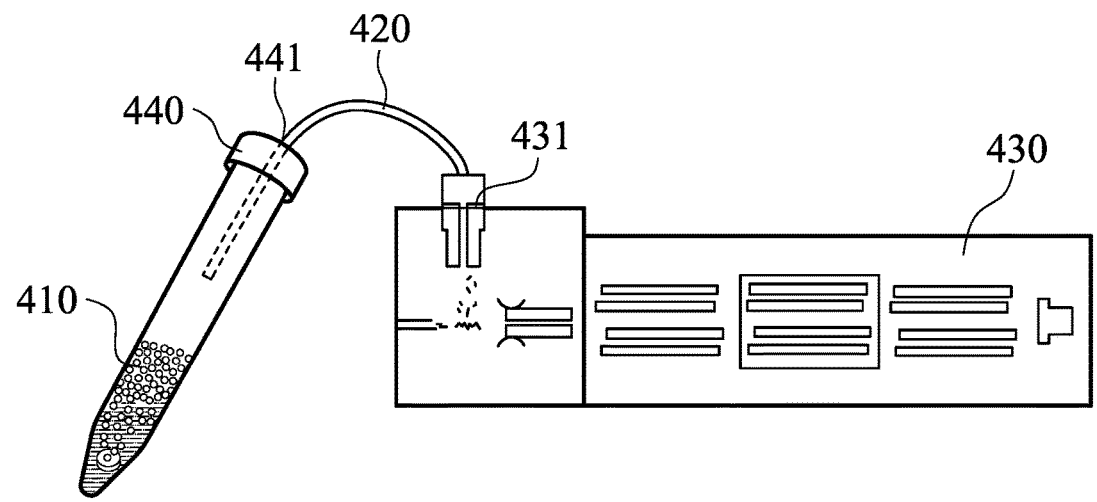
Fig. 4A
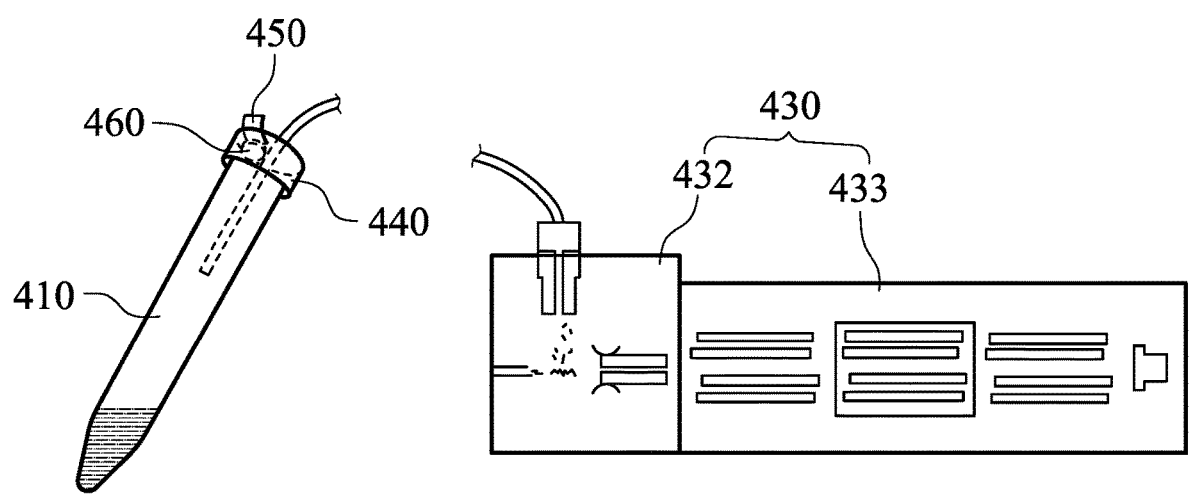
Fig. 4B
Fig. 4C

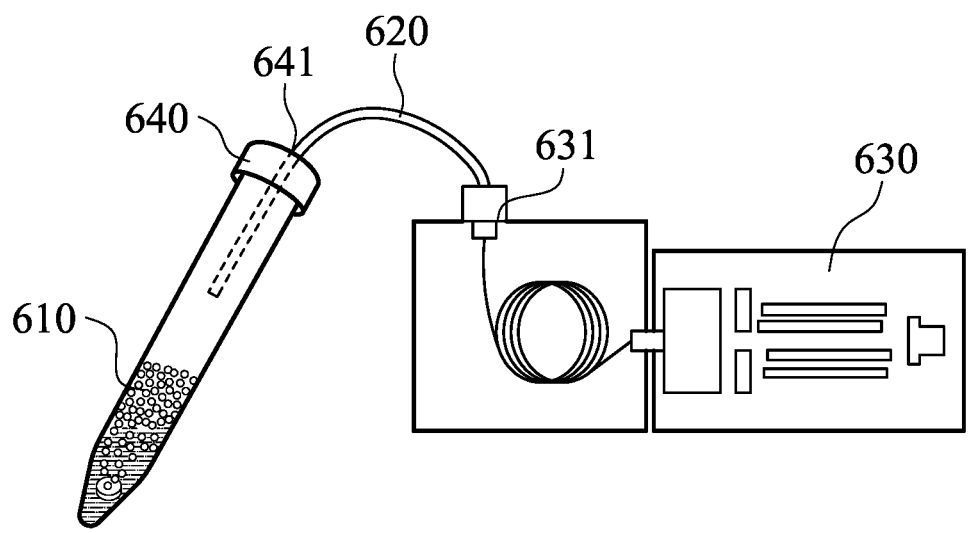
Fig. 6A
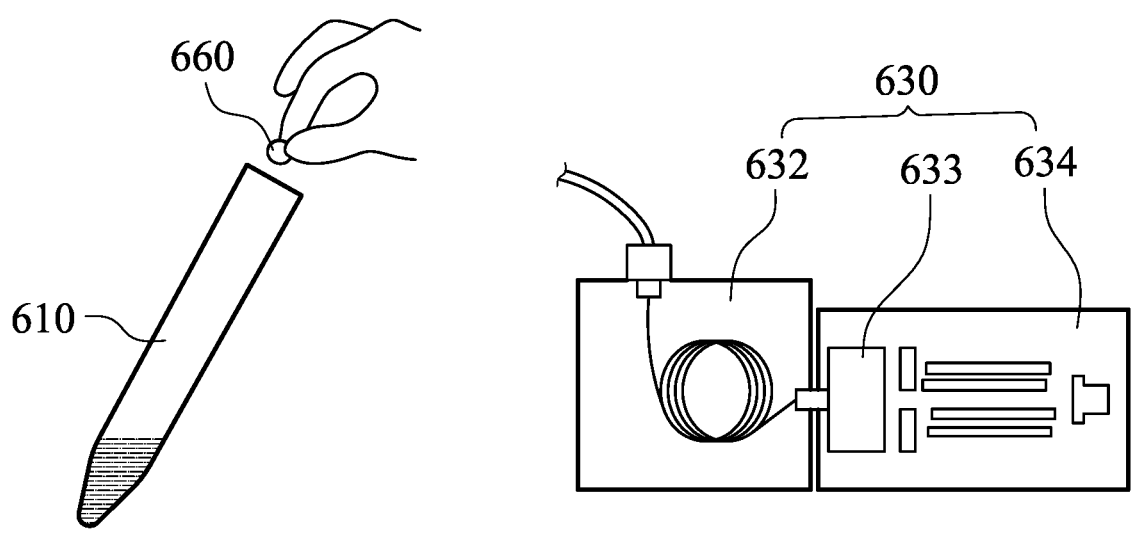
Fig. 6B
Fig. 6C

METHOD FOR EXTRACTING AND DETECTING VOLATILE ORGANIC COMPOUNDS

BACKGROUND

Technical Field

The present disclosure relates to a method for extracting and detecting volatile organic compounds. More particularly, the present disclosure relates to a method for extracting and detecting volatile organic compounds by using an effervescence extraction technique.

Description of Related Art

At the present time, extraction is often used to analyze the specific components in the liquid matrices, including the volatile and the non-volatile substances. The purpose of extraction is to transfer the specific components from the mixture to another solvent due to the different solubilities of the specific components in the different solvents to achieve the separation.

The common extraction technique is liquid-liquid extraction. In this process, sample liquid is mixed with an extracting solvent that is immiscible or slightly miscible with the sample solvent, wherein the extracting solvent and the sample solvent are mixed in the separatory funnel evenly. Due to the different solubilities of the specific components in the two solvents, the specific components are extracted into the extracting solvent in which they have large solubility, and this way the components are separated from the mixture.

However, the large amounts of volatile, flammable, and toxic organic solvents are used in the process of liquid-liquid extraction. In recent years, the relevant industries further develop the solvent-free extraction techniques, such as solid-phase microextraction (SPME), stir-bar sorptive extraction (SBSE), or purge-and-trap. Nonetheless, the above extraction techniques require the use of solid sorbents or cryogenic coolants. This feature makes the implementation of the above-mentioned techniques costly and (in some cases) inconvenient. On the contrary, the extraction technique disclosed here does not require the use of any extracting solvent, sorbent, or cryogenic coolant, so as to reduce the production of chemical waste effectively, reduce the costs, and improve the convenience to the user.

Therefore, how to develop an extraction technique to avoid the use of the hazardous solvents, the complex equipment, costly consumables, and achieve the environmental benefits is the goal of the relevant industry.

SUMMARY

According to one aspect of the present disclosure, a method for extracting and detecting volatile organic compounds includes steps as follows. At least one effervescent tablet is provided, wherein the effervescent tablet is produced by mixing an acidic compound and an alkaline compound homogeneously. An extraction and detection apparatus is provided, wherein the extraction and detection apparatus includes an extraction chamber, an injection tube and a detection instrument, and the extraction chamber is connected with the detection instrument by the injection tube. An extraction step is performed, wherein a liquid matrix is put into the extraction chamber, and the effervescent tablet is added into the liquid matrix to generate bubbles, the volatile organic compounds are extracted from the liquid matrix by the bubbles, and the bubbles enter into the headspace of the extraction chamber. A detection step is performed, wherein the volatile organic compounds extracted during the extraction step are transferred to the detection instrument via the injection tube, so as to detect the volatile organic compounds.

BRIEF DESCRIPTION OF THE DRAWINGS

The present disclosure can be more fully understood by reading the following detailed description of the embodiment, with reference made to the accompanying drawings as follows:

FIGS. 4A, 4B and 4C are process diagrams of the method for extracting and detecting the volatile organic compounds as shown in FIG. 3.

FIGS. 6A, 6B and 6C are process diagrams of the method for extracting and detecting the volatile organic compounds as shown in FIG. 5.

DETAILED DESCRIPTION

Figure 1:
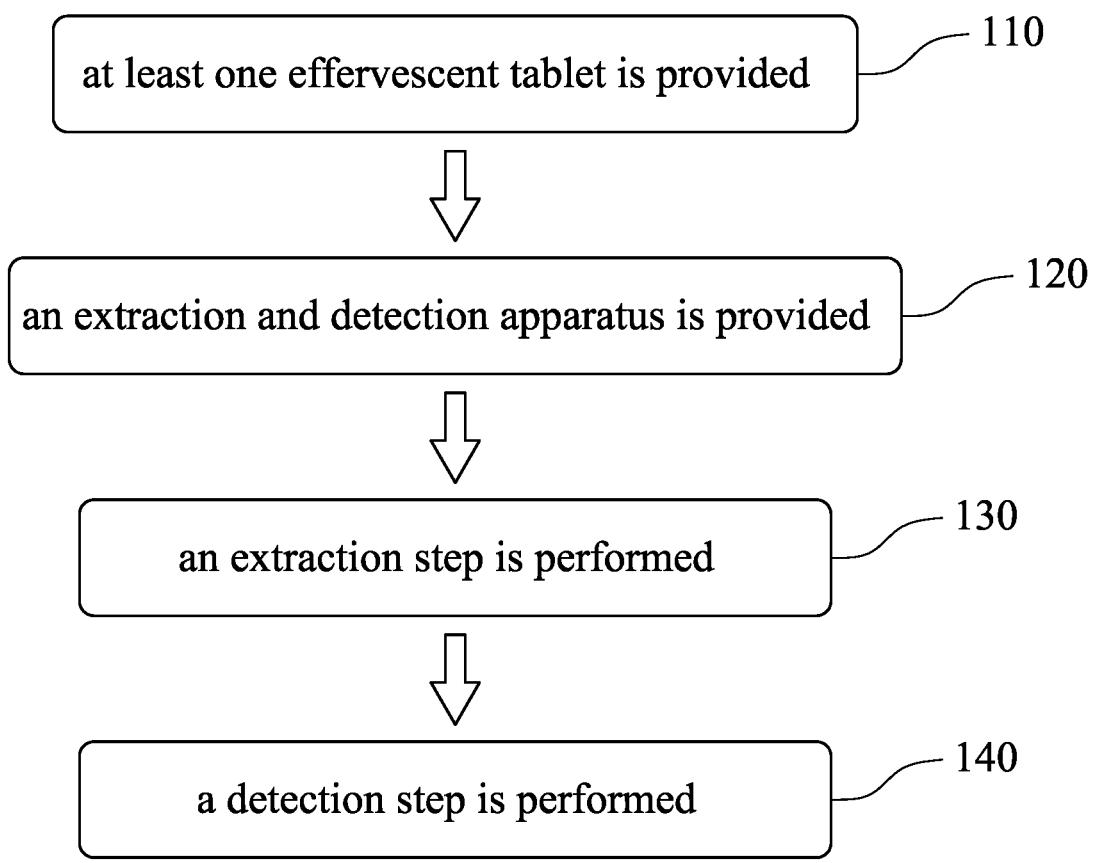
FIG. 1 is a flow chart of a method for extracting and detecting volatile organic compounds according to one embodiment of the present disclosure.
Figure 2:
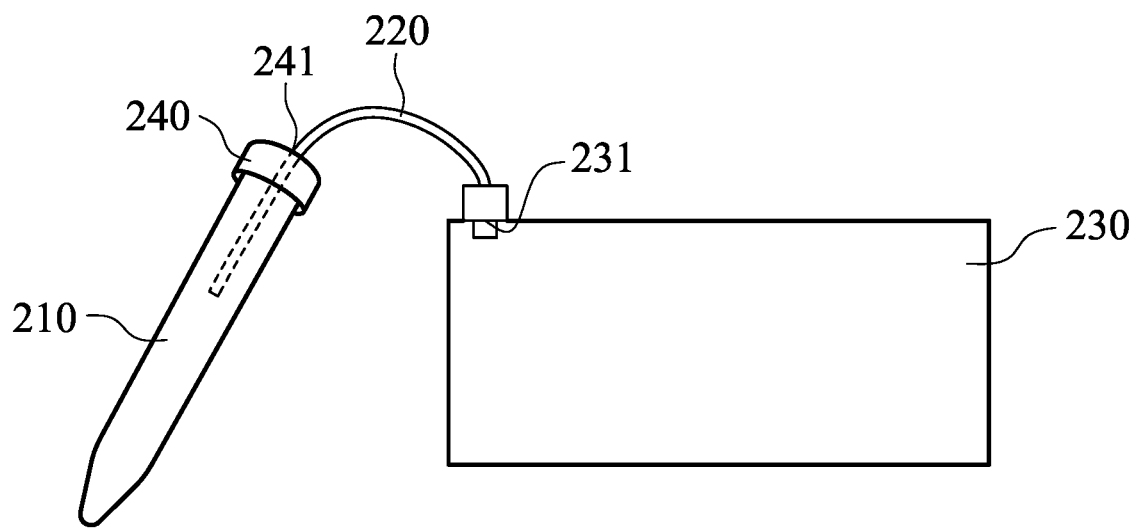
FIG. 2 is a perspective view of an extraction and detection apparatus according to one embodiment of the present disclosure.

Please refer to FIGS. 1 and 2. FIG. 1 is a flow chart of a method for extracting and detecting volatile organic compounds 100 according to one embodiment of the present disclosure. FIG. 2 is a perspective view of an extraction and detection apparatus according to one embodiment of the present disclosure. The method for extracting and detecting the volatile organic compounds 100 includes a step 110, a step 120, a step 130, and a step 140.

In the step 110, at least one effervescent tablet is provided, wherein the effervescent tablet is produced by mixing an acidic compound and an alkaline compound homogeneously. The effervescent tablet is prepared by mixing sodium dihydrogen phosphate, sodium bicarbonate, cobalt chloride and polyvinylpyrrolidone homogeneously in a vortex mixer, so as to form a mixture, wherein sodium dihydrogen phosphate is the acidic compound of the effervescent tablet, and sodium bicarbonate is the alkaline compound of the effervescent tablet. Therefore, when the effervescent tablet is contacted with water or other liquids, the acid-base reaction is occurred so as to generate carbon dioxide, and the effervescent tablet can be decomposed rapidly in water or other liquids. The aforementioned acid-base reaction equation can be written in a simplified way as follows:

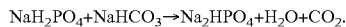

$$NaH_2PO_4 + NaHCO_3 \rightarrow Na_2HPO_4 + H_2O + CO_2.$$

Furthermore, polyvinylpyrrolidone and cobalt chloride are auxiliary components. Polyvinylpyrrolidone is used as a binder, so as to make the prepared effervescent tablet hard enough to form, and cobalt chloride is added to indicate whether the effervescent tablet has had contact with water (e.g. moisture) before the extraction process. If the effervescent tablet has absorbed a considerable amount of water from the environment, it may not be suitable for extraction any longer. When cobalt chloride is contacted with water, the color of cobalt chloride will be changed. Therefore, when the effervescent tablet is dry, the color of the effervescent tablet will be lavender, and when the effervescent tablet is contacted with water, the color of the effervescent tablet will be pink. Thus, one can easily verify if the effervescent tablet is dry enough to be used for extraction. The addition of cobalt chloride does not affect the process of the extracting volatile organic compounds by the effervescent tablet.

After homogenization, the mixture is ground into fine powder and pressed into a manual tablet presser, and in order to prevent disintegration upon moving or holding the effervescent tablet, the effervescent tablet is coated by using polyethylene glycol dissolved in ethanol. Then, the effervescent tablet is stored in dry conditions, so as to avoid the effervescent tablet being damp when contacting with the moisture in air, and to prevent acid-base reaction before the effervescent tablet is used for extraction.

In the step 120, an extraction and detection apparatus 200 is provided, as shown in FIG. 2. The extraction and detection apparatus 200 includes an extraction chamber 210, an injection tube 220 and a detection instrument 230, wherein the detection instrument 230 includes an injector port 231, and the injector port 231 is connected with the injection tube 220. Furthermore, the extraction chamber 210 further includes a cap 240, and the cap 240 includes a hole 241 for the injection tube 220 to pass through. Therefore, the extraction chamber 210 is connected with the detection instrument 230 by the injection tube 220.

In the step 130, an extraction step is performed, wherein a liquid matrix is put into the extraction chamber 210, and the effervescent tablet is added into the liquid matrix to generate bubbles. Specifically, when the effervescent tablet is reacted with the liquid matrix, the volatile organic compounds are extracted from the liquid matrix by the bubbles, and the bubbles enter into the headspace of the extraction chamber 210. Furthermore, the liquid matrix can be water, a liquid sample, a solution of a liquid sample, or a solution of a solid sample. The liquid sample can be but is not limited to the fluid substances, such as drinks, foods, cosmetics, etc. The liquid sample may be diluted with pure solvent, such as water or an organic liquid first, so as to be the liquid matrix. Moreover, the solid sample may be dissolved in a liquid to provide the liquid matrix for extraction.

In the step 140, a detection step is performed, wherein the volatile organic compounds extracted during the extraction step are transferred to the detection instrument 230 via the injection tube 220, so as to detect the volatile organic compounds. Specifically, in the extraction step, the carbonation of the effervescent tablet facilitates the transfer of the volatile molecules between the liquid matrix and the gas phase, so that the volatile organic compounds extracted from the liquid matrix enter the gas phase, and the volatile organic compounds are transferred to the detection instrument 230 via the injection tube 220 by the pressure difference between the headspace of the extraction chamber 210 and the detection instrument 230 to perform the detection of the extracted volatile organic compounds. Furthermore, the step 130 and the step 140 are performed sequentially, and a total time of the step 130 and the step 140 is normally less than 10 minutes.

Figure 3:
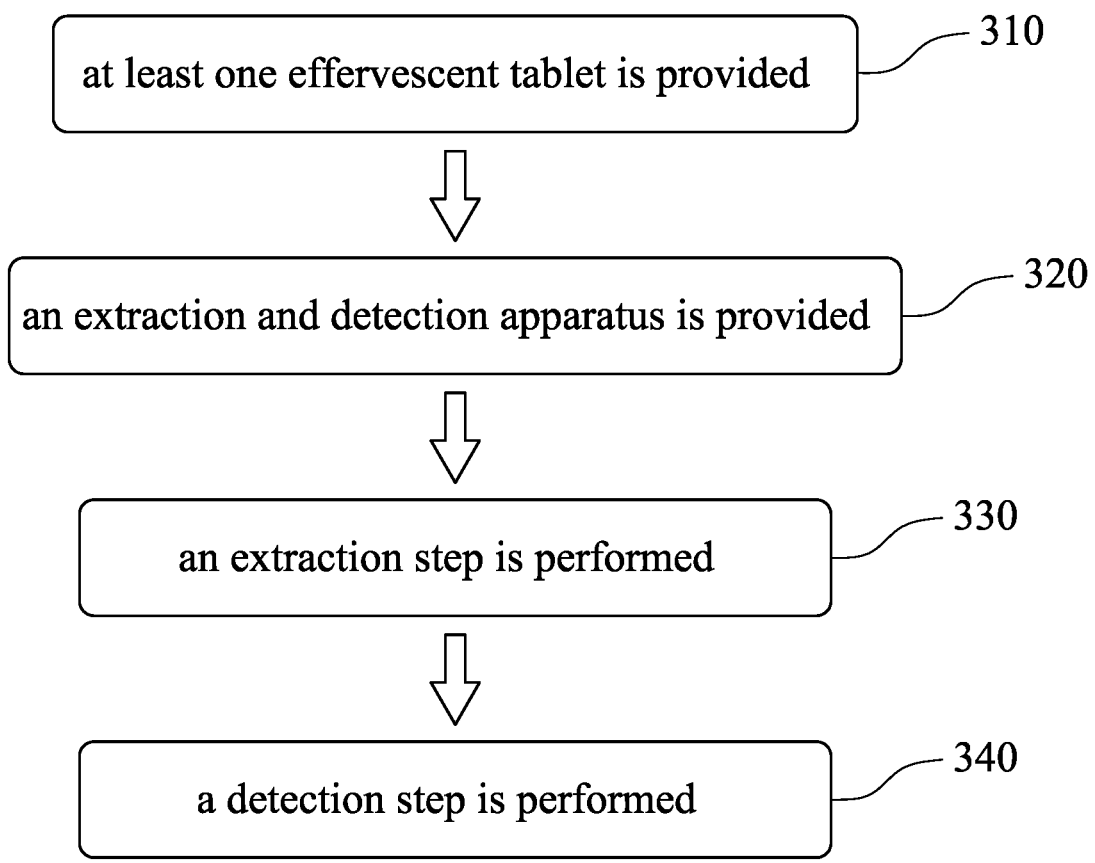
FIG. 3 is a flow chart of a method for extracting and detecting volatile organic compounds according to another embodiment of the present disclosure.

Please refer to FIGS. 3, 4A, 4B and 4C. FIG. 3 is a flow chart of a method for extracting and detecting volatile organic compounds 300 according to another embodiment of the present disclosure. FIGS. 4A, 4B and 4C are process diagrams of the method for extracting and detecting the volatile organic compounds 300 as shown in FIG. 3. The method for extracting and detecting the volatile organic compounds 300 includes a step 310, a step 320, a step 330, and a step 340.

In the step 310, at least one effervescent tablet is provided. The details of the step 310 are the same as those in the step 110 of FIG. 1, and will not be repeated herein.

In the step 320, an extraction and detection apparatus 400 is provided, as shown in FIG. 4A. The extraction and detection apparatus 400 includes an extraction chamber 410, an injection tube 420 and a first detection instrument 430, wherein the first detection instrument 430 includes an injector port 431 for connecting the injection tube 420. Furthermore, the extraction chamber 410 further includes a cap 440, and the cap 440 includes a hole 441 for the injection tube 420 to pass through. Therefore, the extraction chamber 410 is connected with the first detection instrument 430 by the injection tube 420.

In the step 330, an extraction step is performed, wherein the effervescent tablet 460 containing a metallic substance, such as a metal wire or metal particles, is positioned inside the cap 440 by a magnet 450, so as to hold the effervescent tablet 460, as shown in FIG. 4B. Therefore, when the magnet 450 is removed, the magnetic attraction between the effervescent tablet 460 and the magnet 450 disappears, so that the effervescent tablet 460 is dropped into the extraction chamber 410 to react with the liquid matrix to generate the bubbles. The volatile organic compounds are extracted from the liquid matrix by the bubbles, and the bubbles enter into the headspace of the extraction chamber 410. Furthermore, when the effervescent tablet 460 is prepared, the metallic substance is added to the powdered components before using the manual tablet presser, so that the effervescent tablet 460 can be attracted by the magnet 450.

In the step 340, a detection step is performed, wherein the volatile organic compounds extracted from the step 330 are transferred to the first detection instrument 430 via the injection tube 420, so as to detect the volatile organic compounds. The first detection instrument 430 can be a mass spectrometer, such as an atmospheric pressure chemical ionization triple quadrupole mass spectrometry (APCI-QqQ-MS) system. The detection principle of the step 340 is similar to that of the step 140 of FIG. 1, and will not be repeated herein.

The first detection instrument 430 is divided into two main parts, an ion source 432 and a mass analyzer 433, as shown in FIG. 4C. The ion source 432 is for ionizing the volatile organic compounds by the atmospheric pressure chemical ionization (APCI), and then the ionized volatile organic compounds enter the mass analyzer 433 due to the presence of electric field. The mass analyzer 433 is a triple quadrupole mass spectrometer, wherein the first quadrupole (Q1) is a filter of a precursor ion at particular mass-to-charge ratio (m/z), the second quadrupole or other multipole (q2) is a collision chamber for colliding with the precursor ion to form a product ion, and the third quadrupole (Q3) is a filter of the product ion at particular mass-to-charge ratio (m/z). Therefore, the ions of the particular mass-to-charge ratio can be passed through the mass analyzer 433, so as to analyze the volatile organic compounds.

Figure 5:
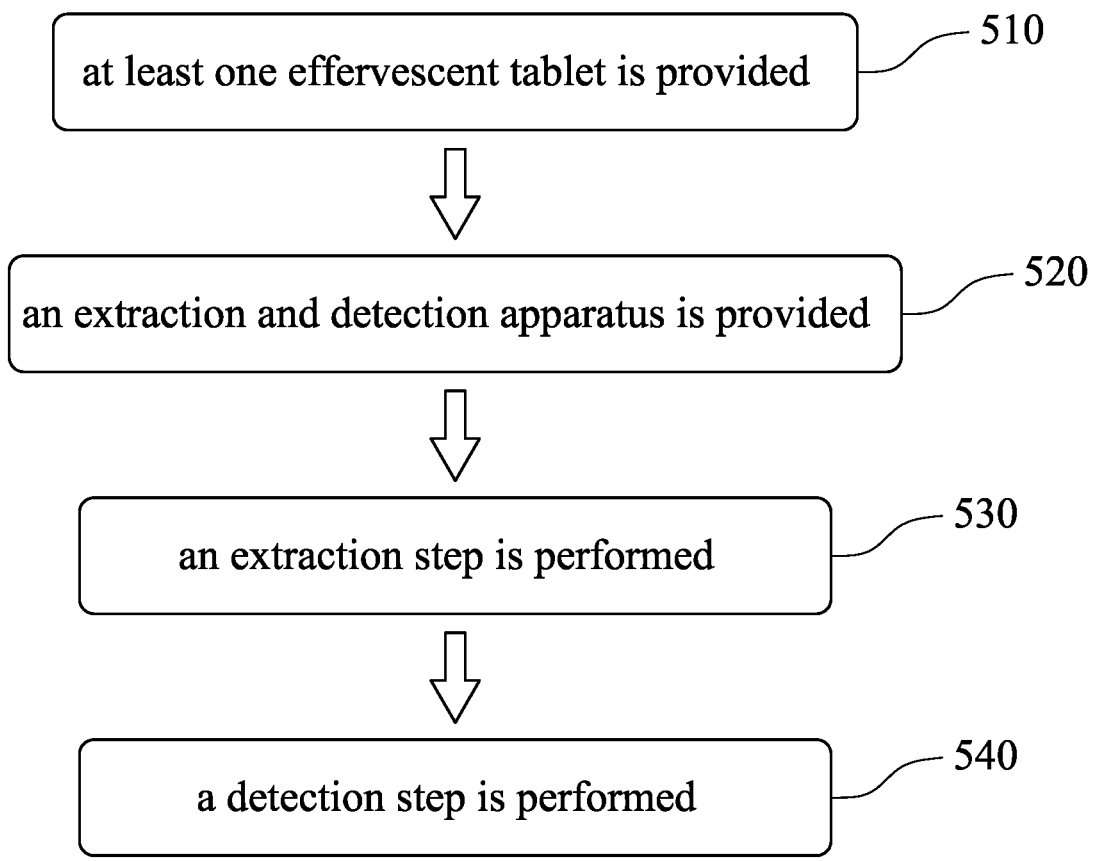
FIG. 5 is a flow chart of a method for extracting and detecting volatile organic compounds according to further another embodiment of the present disclosure.

Please refer to FIGS. 5, 6A, 6B and 6C. FIG. 5 is a flow chart of a method for extracting and detecting volatile organic compounds 500 according to further another embodiment of the present disclosure. FIGS. 6A, 6B and 6C are process diagrams of the method for extracting and detecting the volatile organic compounds 500 as shown in FIG. 5. The method for extracting and detecting the volatile organic compounds 500 includes a step 510, a step 520, a step 530, and a step 540.

In the step 510, at least one effervescent tablet is provided. The details of the step 510 are the same as those in the step 110 of FIG. 1, and will not be repeated herein.

In the step 520, an extraction and detection apparatus 600 is provided, as shown in FIG. 6A. The extraction and detection apparatus 600 includes an extraction chamber 610, an injection tube 620 and a second detection instrument 630, wherein the second detection instrument 630 includes an injector port 631 for connecting the injection tube 620. Furthermore, the extraction chamber 610 further includes a cap 640, and the cap 640 includes a hole 641 for the injection tube 620 to pass through. Therefore, the extraction chamber 610 is connected with the second detection instrument 630 by the injection tube 620.

In the step 530, an extraction step is performed, wherein the effervescent tablet 660 is dropped into the extraction chamber 610 to react with the liquid matrix, so as to generate the bubbles, as shown in FIG. 6B, and then the cap 640 is covered over the extraction chamber 610. The volatile organic compounds are extracted from the liquid matrix by the bubbles, and the bubbles enter into the headspace of the extraction chamber 610.

In the step 540, a detection step is performed, wherein the volatile organic compounds extracted from the step 530 are transferred to the second detection instrument 630 via the injection tube 620, so as to detect the volatile organic compounds. The second detection instrument 630 can be a separation device, such as a gas chromatography system hyphenated with electron ionization quadrupole mass spectrometry (GC-EI-Q-MS). The detection principle of the step 540 is similar to that in the step 140 of FIG. 1, and will not be repeated herein.

The second detection instrument 630 is divided into three main parts, a gas chromatograph 632, an ion source 633, and a mass analyzer 634, as shown in FIG. 6C. The gas chromatograph 632 is for carrying the volatile organic compounds by the carrier gas, and the volatile organic compounds are separated within a chromatographic column due to the different chemical properties of each volatile organic compound. Next, the separated volatile organic compounds are eluted from the column at the different retention times, and then they enter the ion source 633 for the ionization. The ion source 633 ionizes the volatile organic compounds by means of the electron ionization (EI), i.e. collisions with accelerated electrons. Subsequently, the gas-phase ions enter the mass analyzer 634. The mass analyzer 634 is a quadrupole mass spectrometer. At certain DC and AC potentials applied to the quadrupole rods, the ions of a particular mass-to-charge ratio pass through the mass analyzer 634 and reach detector positioned near the exit of the quadrupole. By ramping up the applied DC and AC potentials in quadrupole, the ions of the different volatile organic compounds with different mass-to-charge ratios reach the detector sequentially.

Therefore, the method for extracting and detecting the volatile organic compounds of the present disclosure enables the detection of the volatile organic compounds extracted from the liquid matrix by an effervescence extraction technique. The aforementioned method can avoid the use of hazardous solvents for extraction, does not use large sample volume, does not require multi-step extraction, pre-concentration, and clean-up. Furthermore, the aforementioned method does not need bulky and costly equipment and other consumables (e.g. sorbents), which are often used for extraction of the volatile organic compounds by other techniques.

EXAMPLES

1. Preparation of an Effervescent Tablet

An effervescent tablet of the present disclosure is produced by mixing sodium dihydrogen phosphate, sodium bicarbonate, cobalt chloride and polyvinylpyrrolidone homogeneously, so as to form a mixture, wherein the total weight of the effervescent tablet is 100 wt %, the content of sodium dihydrogen phosphate is 63 wt %, the content of sodium bicarbonate is 33 wt %, the content of cobalt chloride is 3 wt %, and the content of polyvinylpyrrolidone is 1 wt %. First, the mixture is homogenized by using a vortex mixer for 1 hour. After the homogenization, the mixture is ground into fine powder and divided into the aliquot for each effervescent tablet according to the weight of 500±0.50 mg, and the aliquot is placed into a manual tablet presser, so as to form the effervescent tablet. Then, the effervescent tablet is coated with 0.5 M polyethylene glycol in ethanol, and stored in a desiccator. Furthermore, for producing the effervescent tablet used in the step 330 of the method for extracting and detecting volatile organic compounds 300 in FIG. 3, a metal wire is added before placing the aliquot into the manual tablet presser, so that the effervescent tablet with the metal wire can be attracted by a magnet, so as to be held inside the a cap.

2. Procedure of Extraction and Detection with APCI-QqQ-MS

An atmospheric pressure chemical ionization triple quadrupole mass spectrometry (APCI-QqQ-MS) system of the present disclosure is used with a 15 mL polypropylene conical tube serving as an extraction chamber, and the extraction chamber is directly connected with a DUIS ion source of a triple quadrupole mass spectrometer (model: LCMS-8030; Shimadzu, Tokyo, Japan) via a 18 cm polytetrafluoroethylene tube (I.D. is 0.3 mm, O.D. is 1.58 mm), wherein the polytetrafluoroethylene tube serves as an injection tube. The DUIS ion source is set to APCI mode, and the voltage applied to the APCI needle is 4.5 kV. The temperature of the desolvation line is set to 250° C. The flow rates of the drying gas (nitrogen) and the nebulizing gas (nitrogen) are set to 10 L/min and 2 L/min, respectively.

2.1 the Effervescent Tablet for Extraction of Ethyl Esters in Water

Figure 7:
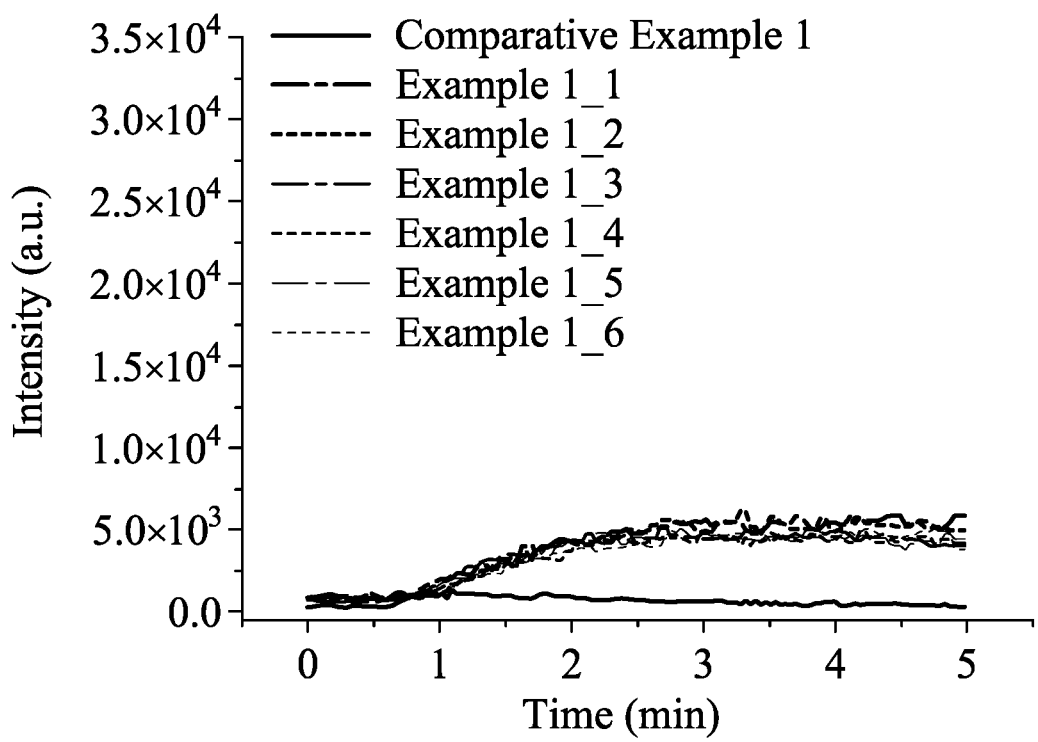
FIG. 7 is a graph of intensity-vs.-time for the volatile organic compounds according to Example 1 of the present disclosure.
Figure 8:
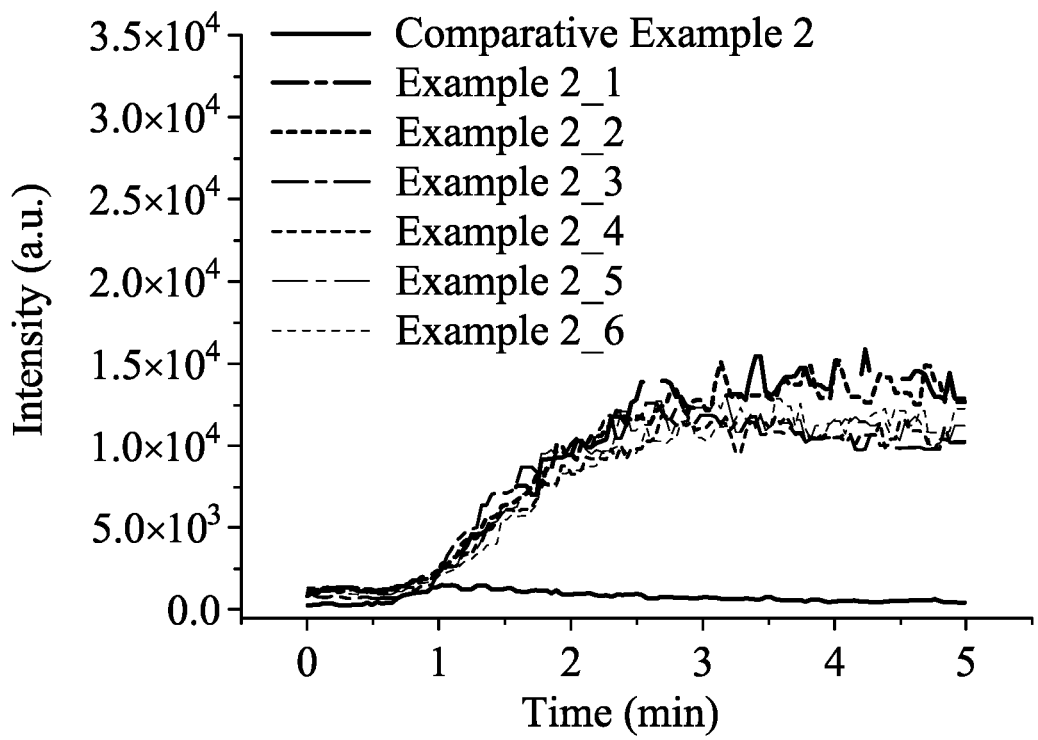
FIG. 8 is a graph of intensity-vs.-time for the volatile organic compounds according to Example 2 of the present disclosure.
Figure 9:
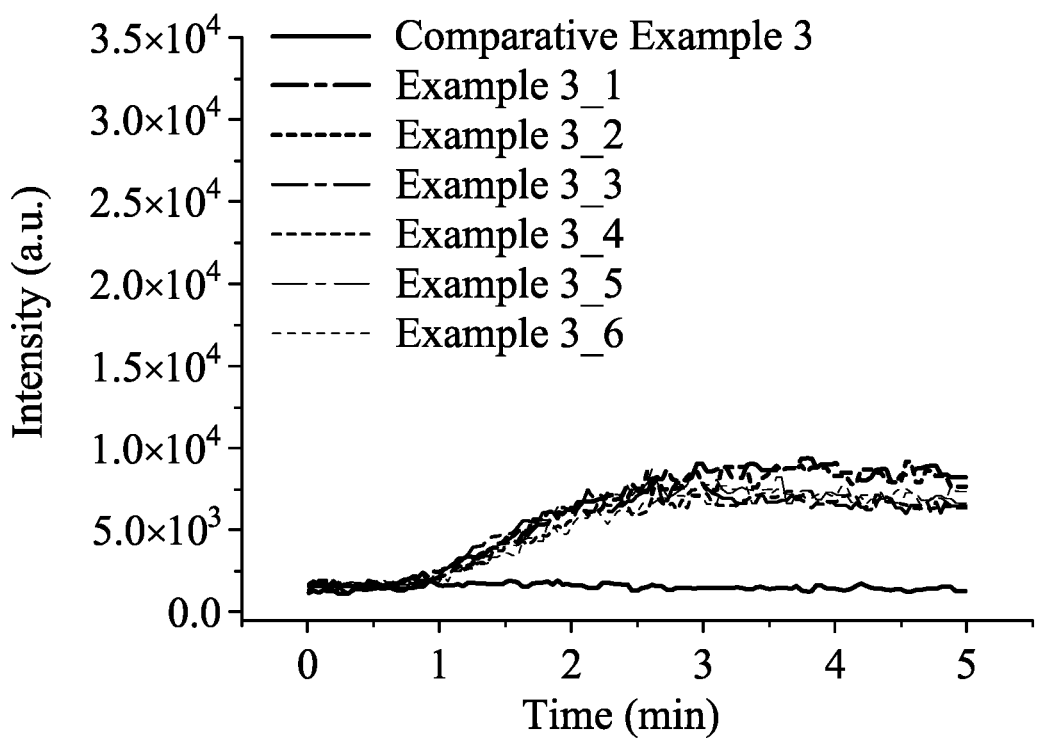
FIG. 9 is a graph of intensity-vs.-time for the volatile organic compounds according to Example 3 of the present disclosure.
Figure 10:
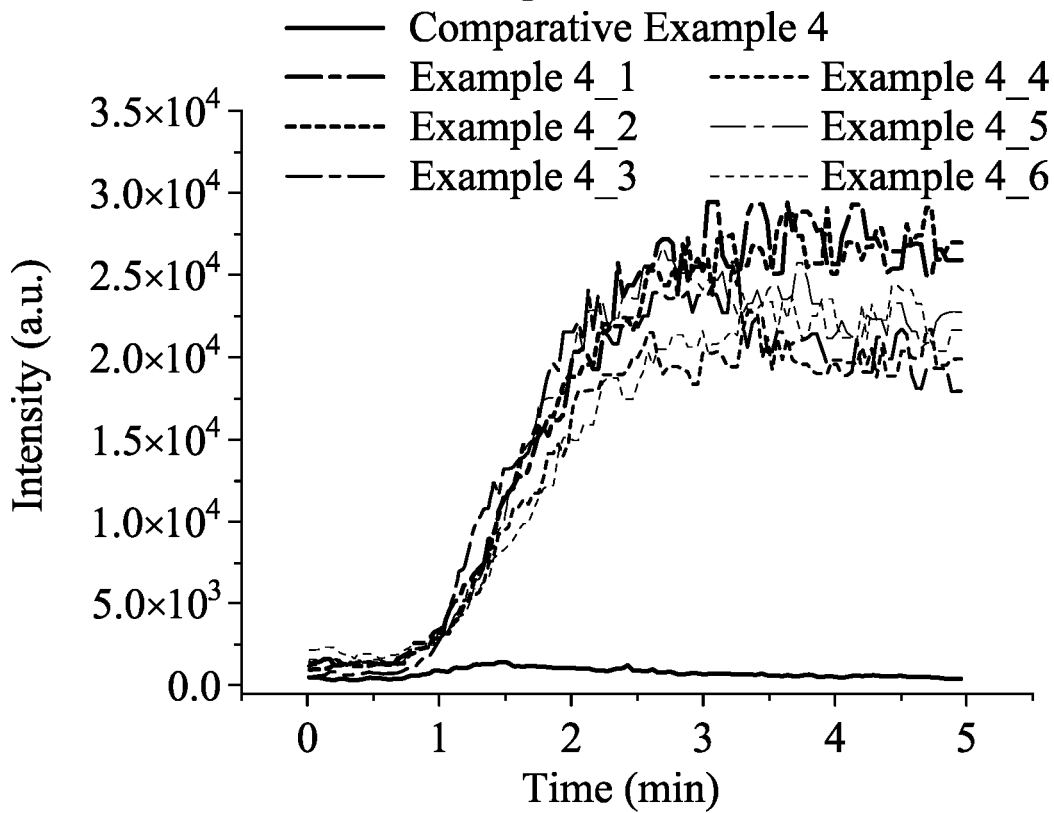
FIG. 10 is a graph of intensity-vs.-time for the volatile organic compounds according to Example 4 of the present disclosure.
Figure 11:
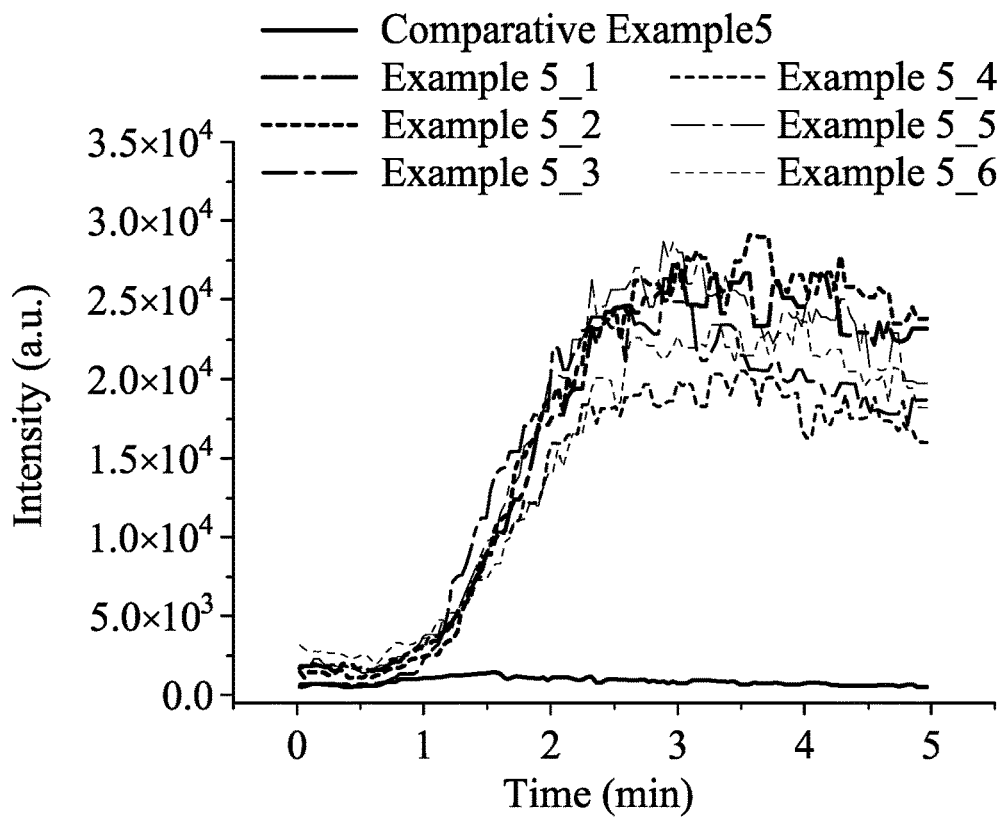
FIG. 11 is a graph of intensity-vs.-time for the volatile organic compounds according to Example 5 of the present disclosure.
Figure 12:
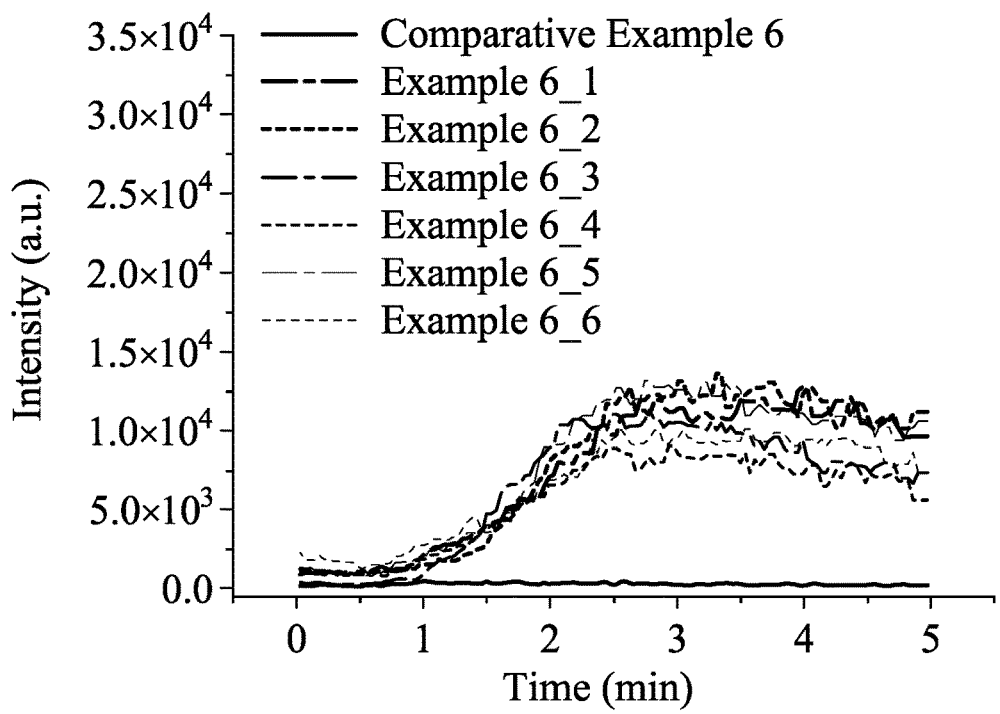
FIG. 12 is a graph of intensity-vs.-time for the volatile organic compounds according to Example 6 of the present disclosure.
Figure 13:
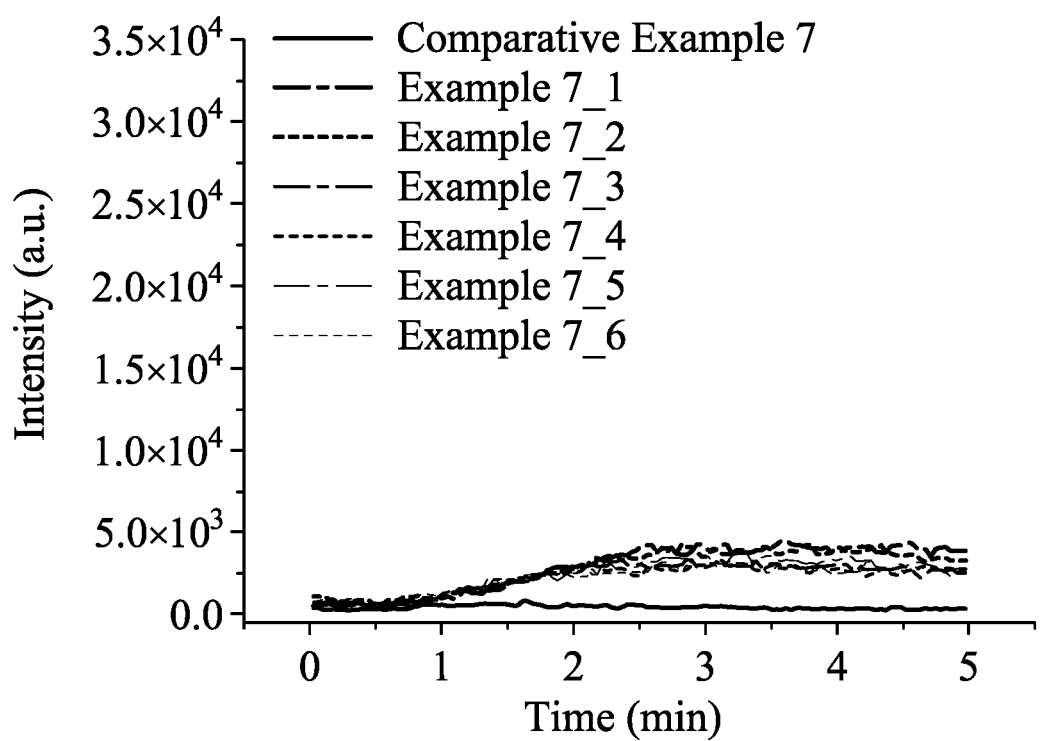
FIG. 13 is a graph of intensity-vs.-time for the volatile organic compounds according to Example 7 of the present disclosure.

Please refer to FIGS. 7, 8, 9, 10, 11, 12, and 13. FIG. 7 is a graph of intensity-vs.-time for the volatile organic compounds according to Example 1 of the present disclosure. FIG. 8 is a graph of intensity-vs.-time for the volatile organic compounds according to Example 2 of the present disclosure. FIG. 9 is a graph of intensity-vs.-time for the volatile organic compounds according to Example 3 of the present disclosure. FIG. 10 is a graph of intensity-vs.-time for the volatile organic compounds according to Example 4 of the present disclosure. FIG. 11 is a graph of intensity-vs.-time for the volatile organic compounds according to Example 5 of the present disclosure. FIG. 12 is a graph of intensity-vs.-time for the volatile organic compounds according to Example 6 of the present disclosure. FIG. 13 is a graph of intensity-vs.-time for the volatile organic compounds according to Example 7 of the present disclosure.

Example 1 to Example 7 of the present disclosure refer to analyses of ethyl esters prepared in pure water as the liquid matrix at the concentration of $1 \times 10^{-6}$ M, and the step 330 to the step 340 of the method for extracting and detecting volatile organic compounds 300 are performed, as shown in FIG. 3. The triple quadrupole mass spectrometer is set to multiple reaction monitoring (MRM) mode, and in this mode, the precursor ion is selected at particular mass-to-charge ratio (m/z) in the first quadrupole (Q1), and collided with argon to form the product ion in the collision chamber of the second quadrupole (q2), then the product ion is selected and detected at particular mass-to-charge ratio (m/z) in the third quadrupole (Q3). That is, MRM mode is for detecting the particular transition from precursor ion to product ion, wherein the dwell time of transition is 100 ms, and the pressure of argon is 230 kPa.

Therefore, Example 1 to Example 7 are based on different transitions, so as to detect the intensities of the corresponding volatile organic compounds in pure water with time. The transition and the corresponding volatile organic compounds of Example 1 to Example 7 are shown in Table 1.

TABLE 1

| | Precursor ion (m/z) | Product ion (m/z) | Collision voltage (V) | Volatile organic compound |
|---|---|---|---|---|
| Example 1 | 89 | 61 | −15 | ethyl acetate |
| Example 2 | 103 | 75 | −15 | ethyl propionate |
| Example 3 | 117 | 43 | −20 | ethyl butyrate |
| Example 4 | 131 | 103 | −15 | ethyl valerate |
| Example 5 | 145 | 117 | −15 | ethyl hexanoate |
| Example 6 | 159 | 131 | −15 | ethyl heptanoate |
| Example 7 | 173 | 145 | −15 | ethyl octanoate |

As shown in FIG. 7 to FIG. 13, the curves of Example 1 to Example 7 do not change within 1 minute of the process. The results indicate that before the effervescent tablet is dropped into the liquid matrix at 1 minute, the volatile organic compounds start to enter the detection instrument. When the volatile organic compounds start to enter the detection instrument, the curves of Example 1 to Example 7 increase until reaching a local plateau until the extraction time reaches 5 minutes. The results indicate that the reaction time should be at least a few seconds, so as to detect the volatile organic compounds of Example 1 to Example 7. The signal intensities of Example 1 to Example 7 are different because the properties of the detected volatile organic compounds are different.

Furthermore, Comparative Example 1 to Comparative Example 7 are provided following the same procedure as Example 1 to Example 7 but without the effervescent tablet. The results indicate that the effervescent tablet assists the extraction of the volatile organic compounds from the liquid matrix to the gas phase and facilitates their rapid transfer to the detection instrument.

3. Procedure of Extraction Followed by Detection with GC-EI-Q-MS

A gas chromatography system hyphenated with electron ionization quadrupole mass spectrometry system (GC-EI-Q-MS) of the present disclosure is used with a 15 mL polypropylene conical tube serving as an extraction chamber, and the extraction chamber is covered with a cap connected with a needle via an 18 cm polytetrafluoroethylene tube (I.D. is 0.3 mm, O.D. is 1.58 mm), wherein the polytetrafluoroethylene tube serves as an injection tube. Initially, the needle is connected with an injection port of a gas chromatograph (TRACE GC; Thermo Fisher Scientific, Waltham, Mass.) hyphenated with a single quadrupole mass spectrometer (ISQ; Thermo Fisher Scientific) but the extraction chamber cap (connected to the injection tube) is not yet placed on the top of the extraction chamber. When the effervescent tablet is put in the extraction chamber, the extraction chamber is covered with an intact cap (without injection tube) for 30 seconds to let the extracted volatile organic compounds accumulate in the extraction chamber headspace. Subsequently, the intact cap is removed, and the cap connected to the injection tube and needle is fixed on the extraction chamber. After 5 seconds, the needle is removed from the injection port and data acquisition in the detection instrument is started. The carrier gas (helium) is delivered at the flow rate of 0.8 mL/min, the split ratio is 40 to 1. The temperature program is set to 50° C. for 0.30 minutes, next increased to 150° C. at the rate of 25° C. per minute, then increased to 170° C. at the rate of 5° C. per minute, finally increased to 250° C. at the rate of 25° C. per minute, and held for 2 minutes. GC column is SPB-5 capillary column (Supelco Analytical), and the size is 30 m×0.53 mm×1.5 µm.

Furthermore, for detecting ethyl esters and other volatile organic compounds, the quadrupole mass spectrometer is set to full scan mode at m/z scan range from 15 to 450 a.m.u. For quantification, the quadrupole mass spectrometer is set to selected ion monitoring (SIM) mode, and particular m/z value is selected for each analyte.

Figure 14A:
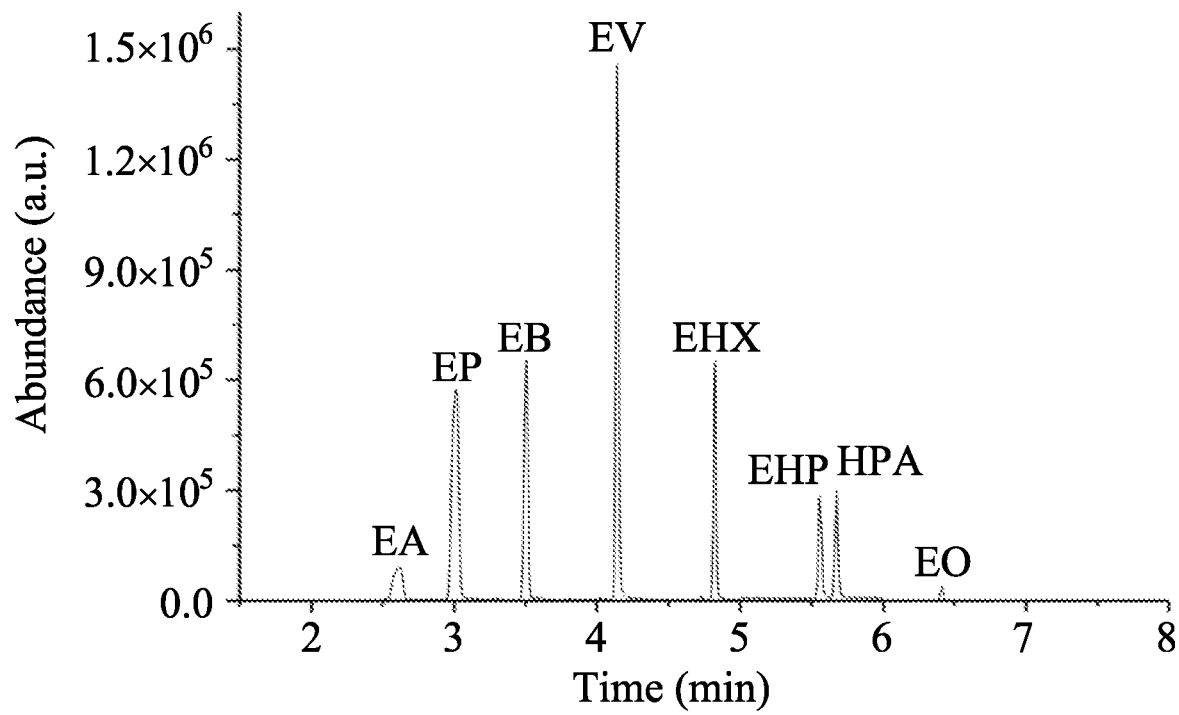
FIG. 14A is a chromatogram according to Example 8 of the present disclosure.
Figure 14B:
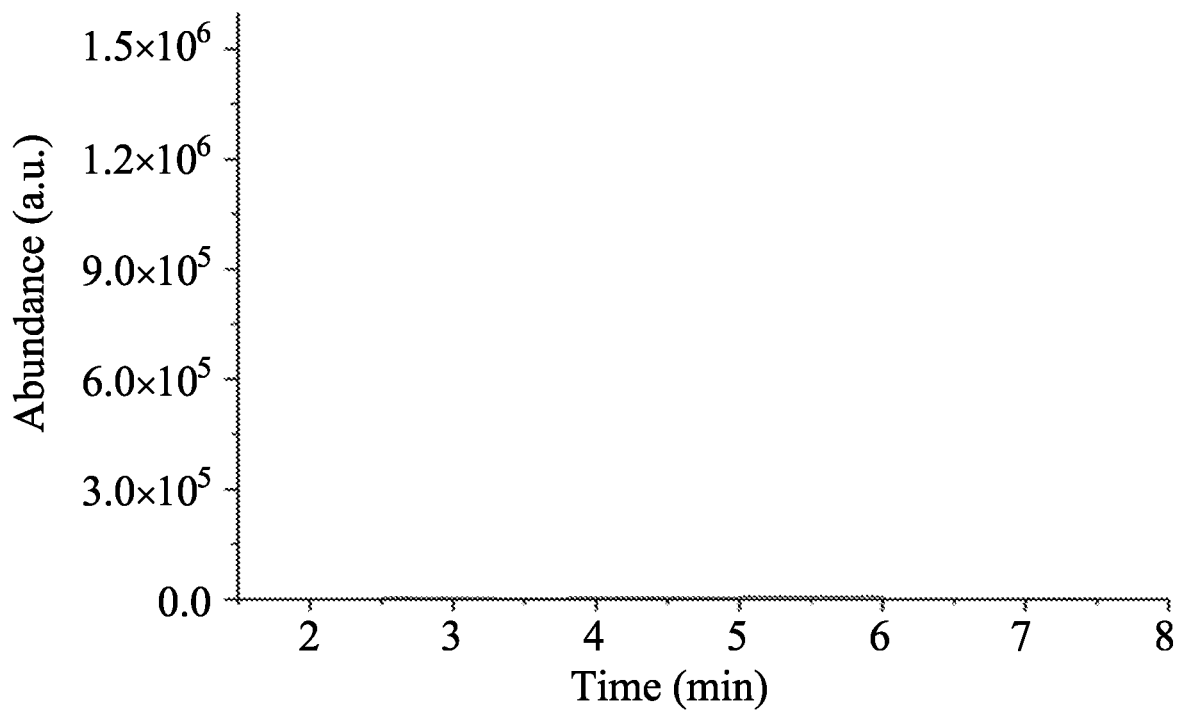
FIG. 14B is a chromatogram according to Comparative Example 8 of the present disclosure.

3.1 the Effervescent Tablet for Extraction of Volatile Organic Compounds Dissolved in Aqueous Matrices Please refer to FIGS. 14A and 14B. FIG. 14A is a chromatogram according to Example 8 of the present disclosure. FIG. 14B is a chromatogram according to Comparative Example 8 of the present disclosure. Example 8 of the present disclosure involves analysis of ethyl ester and heptyl acetate prepared in pure water as the liquid matrix at the concentration of $1\times10^{-5}$ M, and performing the step 530 to the step 540 of the method for extracting and detecting volatile organic compounds 500 in FIG. 5.

As shown in FIGS. 14A and 14B, when the effervescent tablet is added, it reacts with the liquid matrix of Example 8, and the volatile organic compounds are detected by the second detection instrument. Numerous peaks corresponding to the volatile organic compounds are revealed in FIG. 14A, including ethyl acetate (EA), ethyl propionate (EP), ethyl butyrate (EB), ethyl valerate (EV), ethyl hexanoate (EHX), ethyl heptanoate (EHP), ethyl octanoate (EO) and heptyl acetate (HPA). Furthermore, Comparative Example 8 involves the same procedure as Example 8 but without adding the effervescent tablet, and the volatile organic compounds in Comparative Example 8 are not extracted from the liquid matrix, so the corresponding peaks do not appear in FIG. 14B.

Figure 15A:
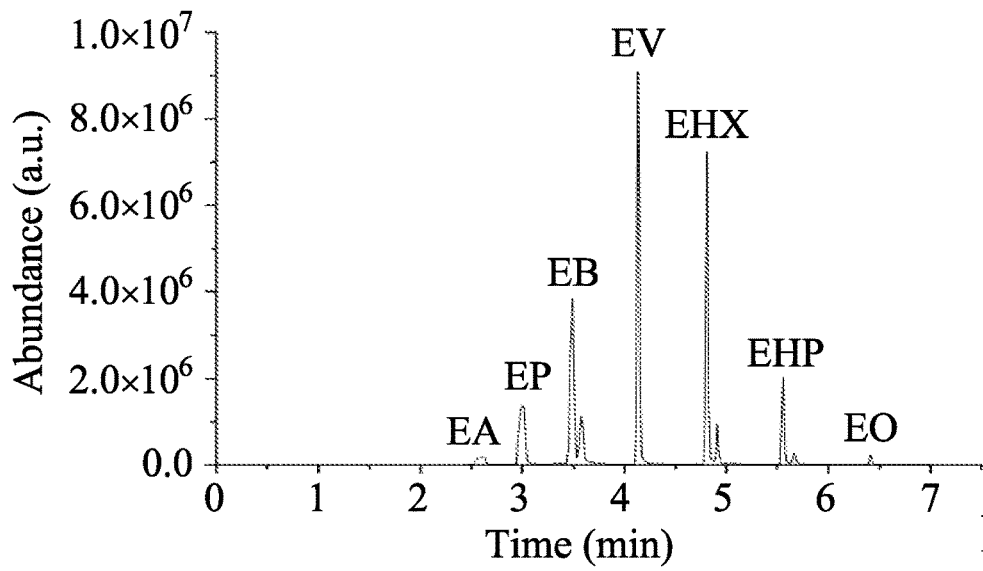
FIGS. 15A, 15B and 15C are chromatograms according to Example 9 of the present disclosure.
Figure 15B:
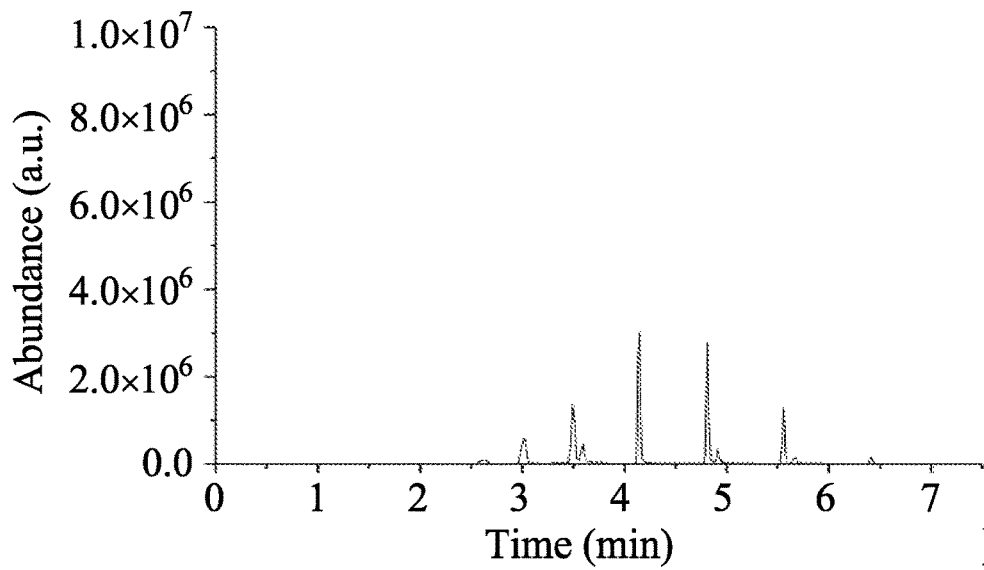
Figure 15C:
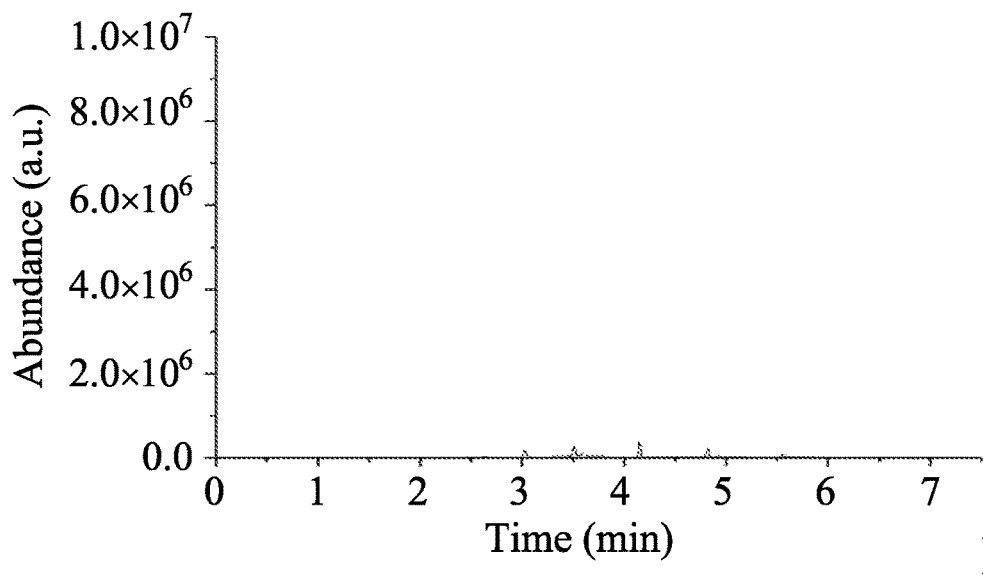

Please refer to FIGS. 15A, 15B and 15C. FIGS. 15A, 15B and 15C are chromatograms according to Example 9 of the present disclosure. The number of the added effervescent tablets of FIG. 15A to FIG. 15C is three tablets, two tablets, and one tablet, respectively. Example 9 of the present disclosure involves analysis of a test sample containing ethyl ester in pure water as the liquid matrix at the concentration of $1\times10^{-6}$ M, and performing the step 530 to the step 540 of the method for extracting and detecting volatile organic compounds 500 in FIG. 5.

As shown in FIGS. 15A, 15B and 15C, when the effervescent tablet is added to react with the liquid matrix of Example 9, the volatile organic compounds are detected from the second detection instrument. Numerous peaks corresponding to the volatile organic compounds are seen in FIGS. 15A, 15B and 15C, including ethyl acetate (EA), ethyl propionate (EP), ethyl butyrate (EB), ethyl valerate (EV), ethyl hexanoate (EHX), ethyl heptanoate (EHP) and ethyl octanoate (EO). However, adding different numbers of the effervescent tablets simultaneously or in a sequence gives rise to the different abundances of the detected volatile organic compounds. The more effervescent tablets are added, the higher peaks of the extracted volatile organic compounds are recorded.

Figure 16A:
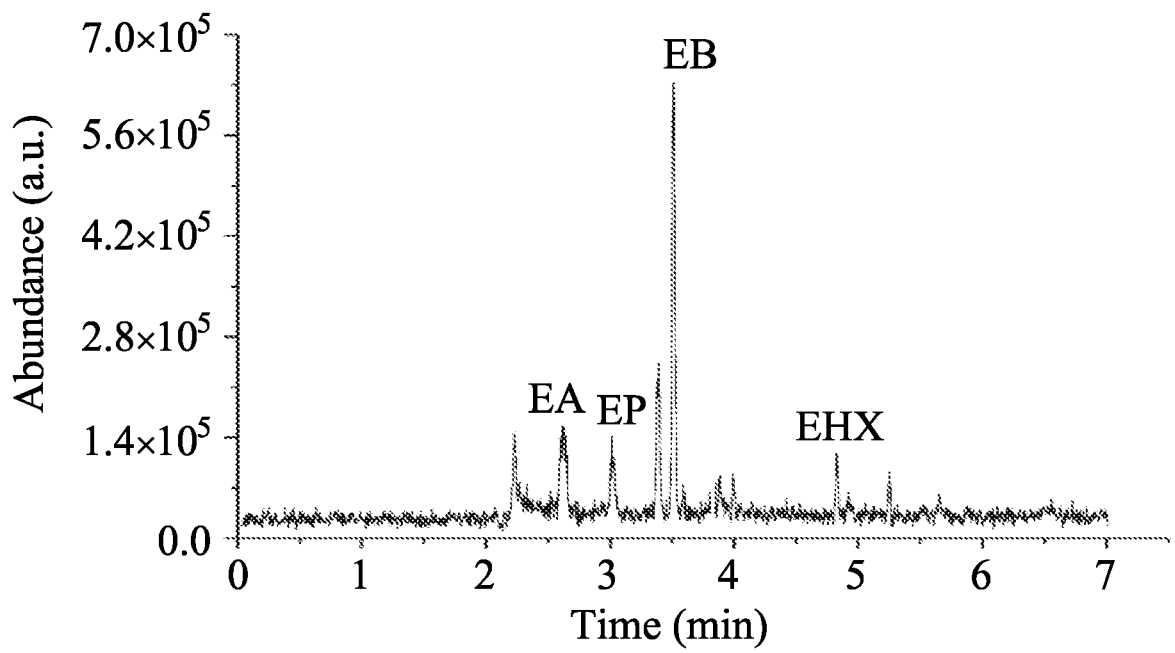
FIG. 16A is a chromatogram according to Example 10 of the present disclosure.
Figure 16B:
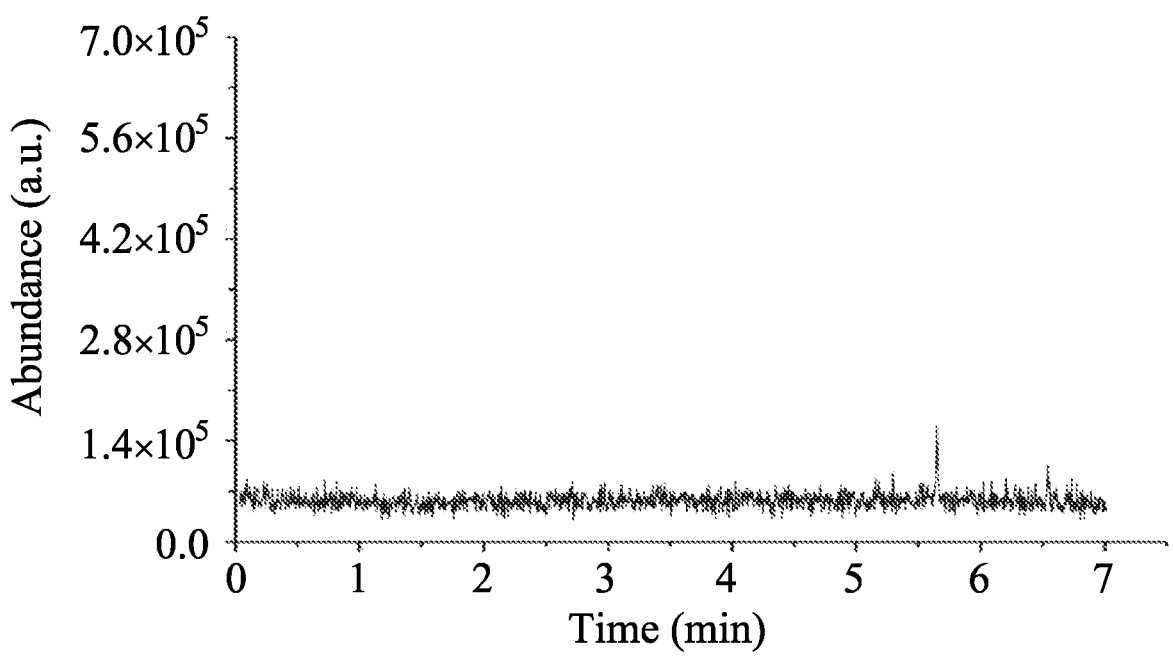
FIG. 16B is a chromatogram according to Comparative Example 10 of the present disclosure.
Figure 17A:
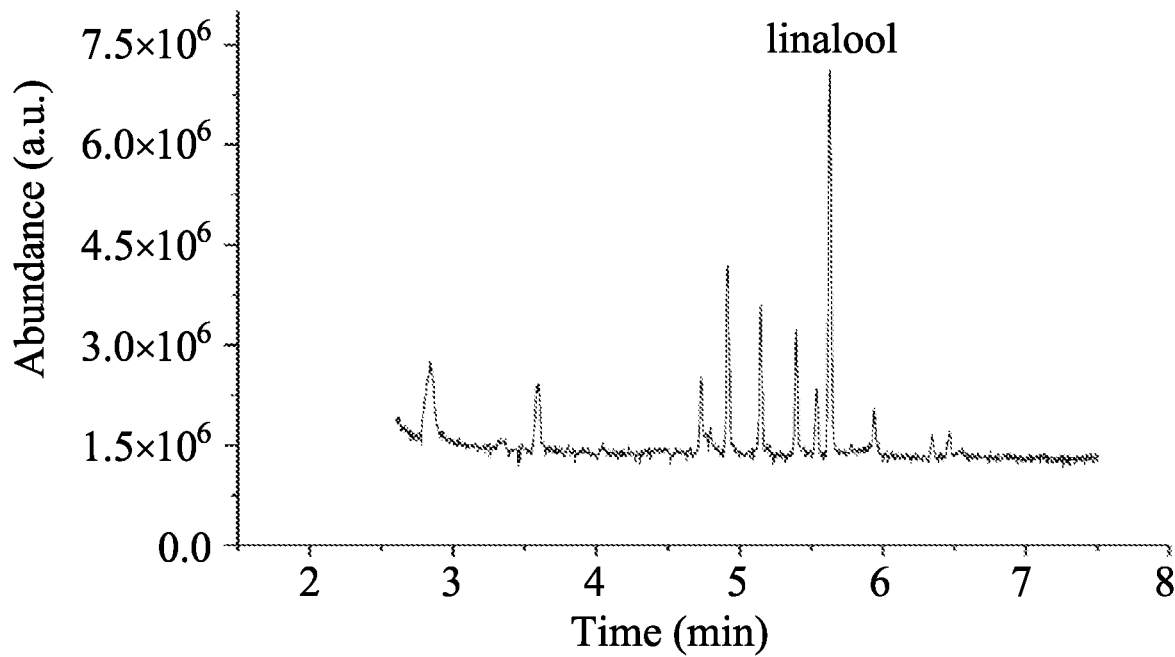
FIG. 17A is a chromatogram according to Example 11 of the present disclosure.
Figure 17B:
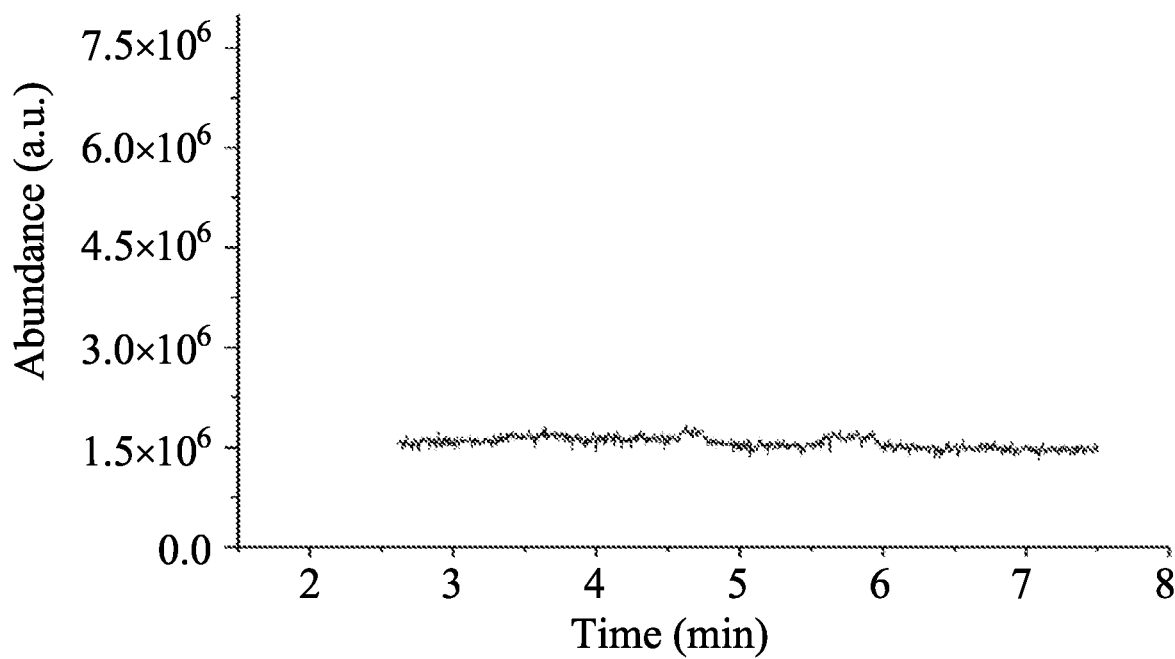
FIG. 17B is a chromatogram according to Comparative Example 11 of the present disclosure.
Figure 18A:
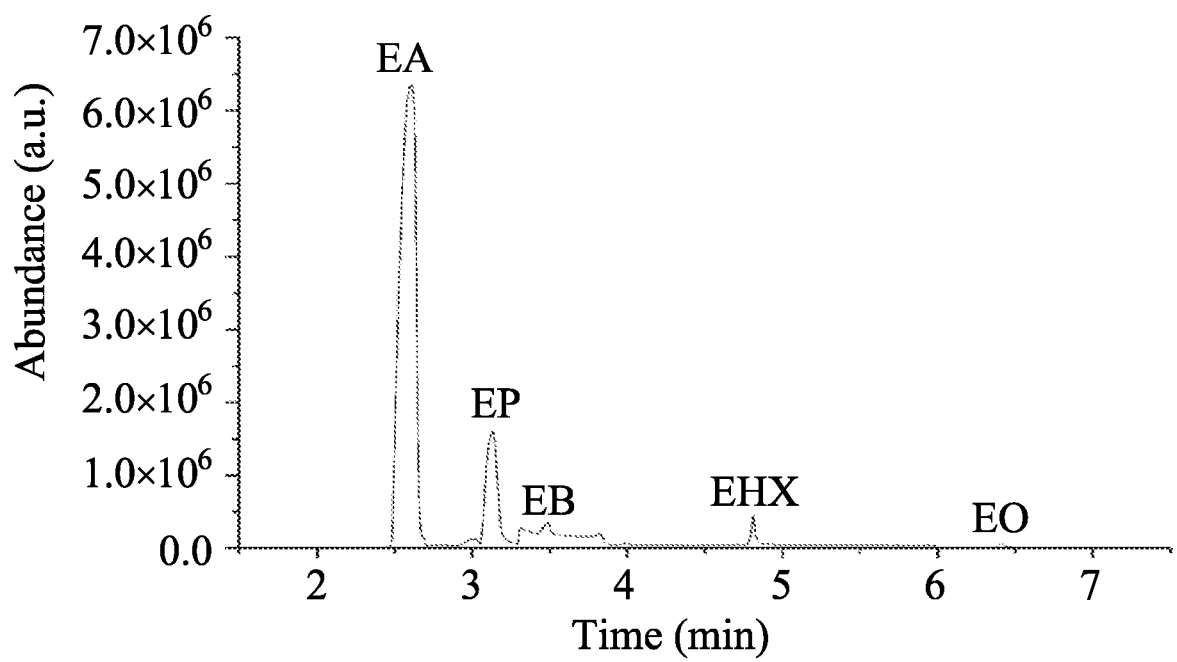
FIG. 18A is a chromatogram according to Example 12 of the present disclosure.
Figure 18B:
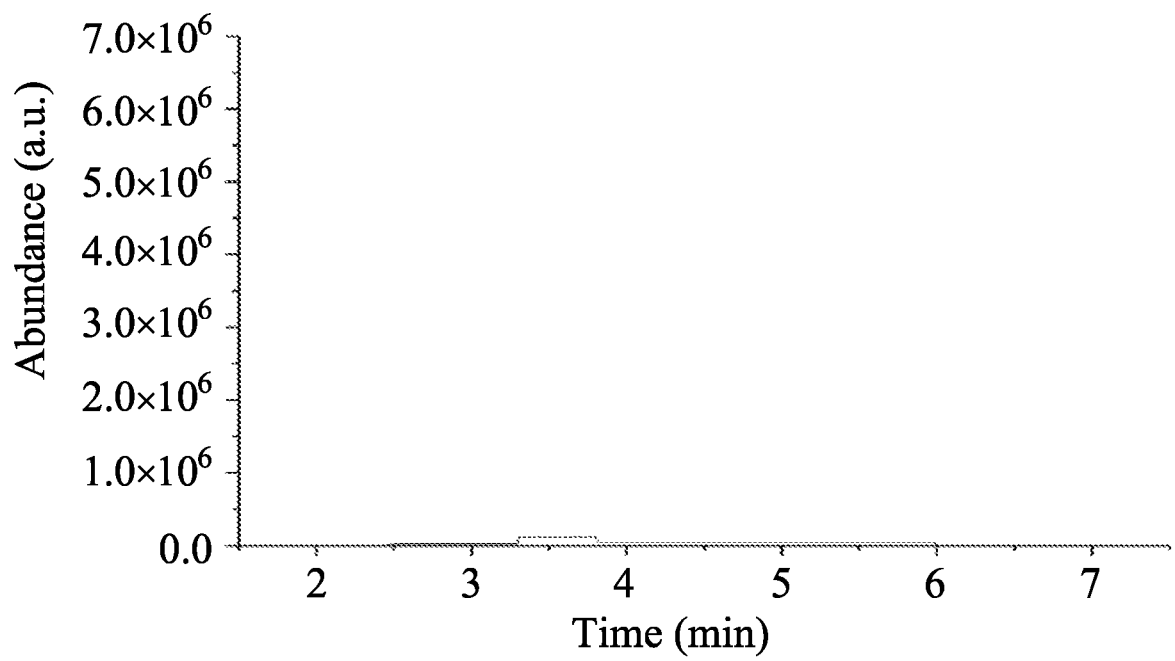
FIG. 18B is a chromatogram according to Comparative Example 12 of the present disclosure.
Figure 19A:
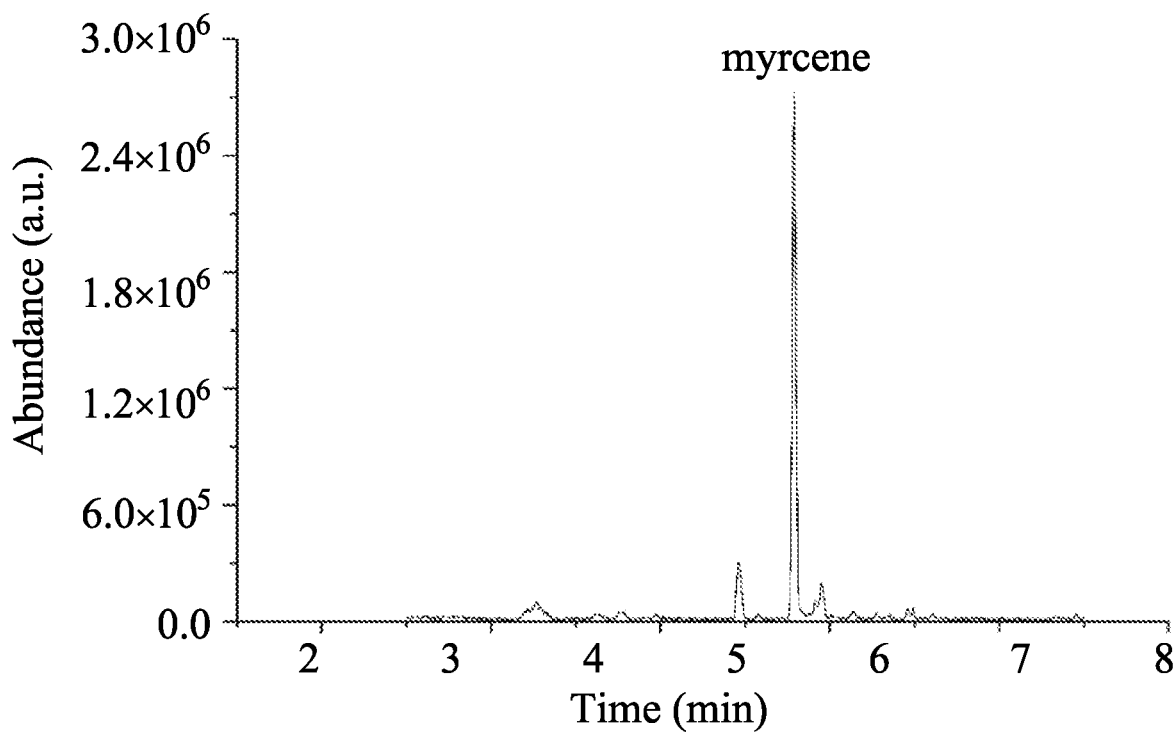
FIG. 19A is a chromatogram according to Example 13 of the present disclosure.
Figure 19B:
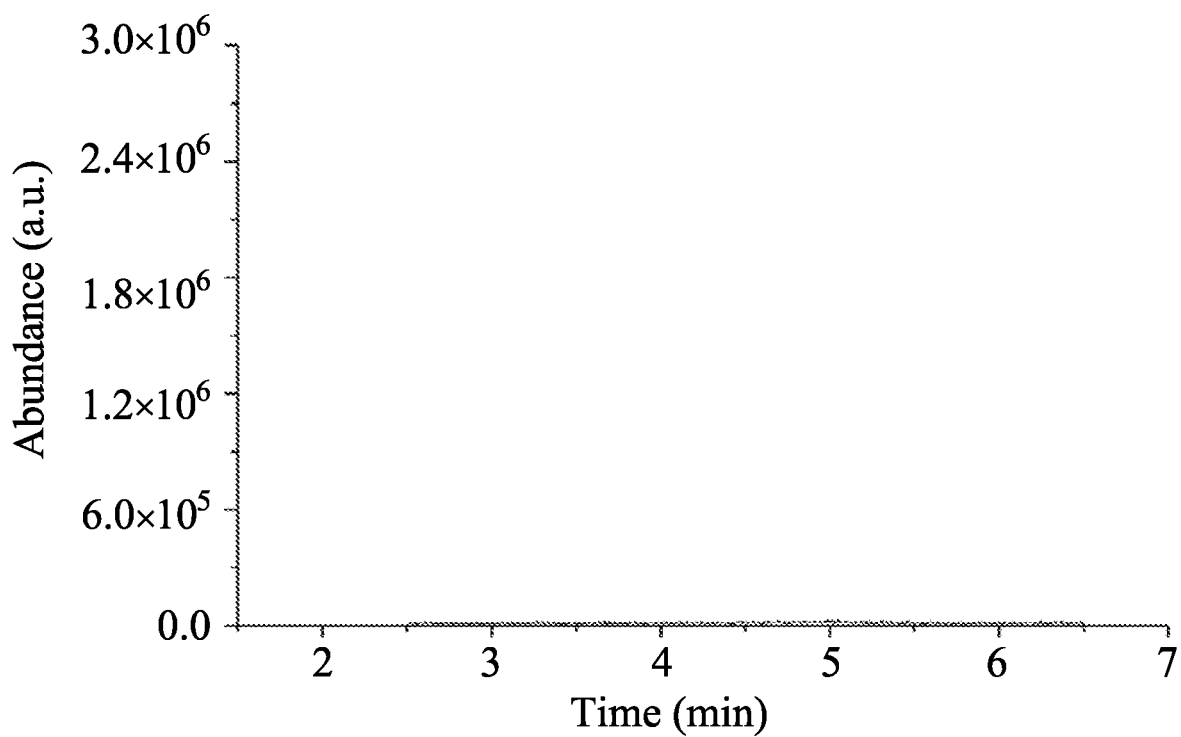
FIG. 19B is a chromatogram according to Comparative Example 13 of the present disclosure.
Figure 20A:
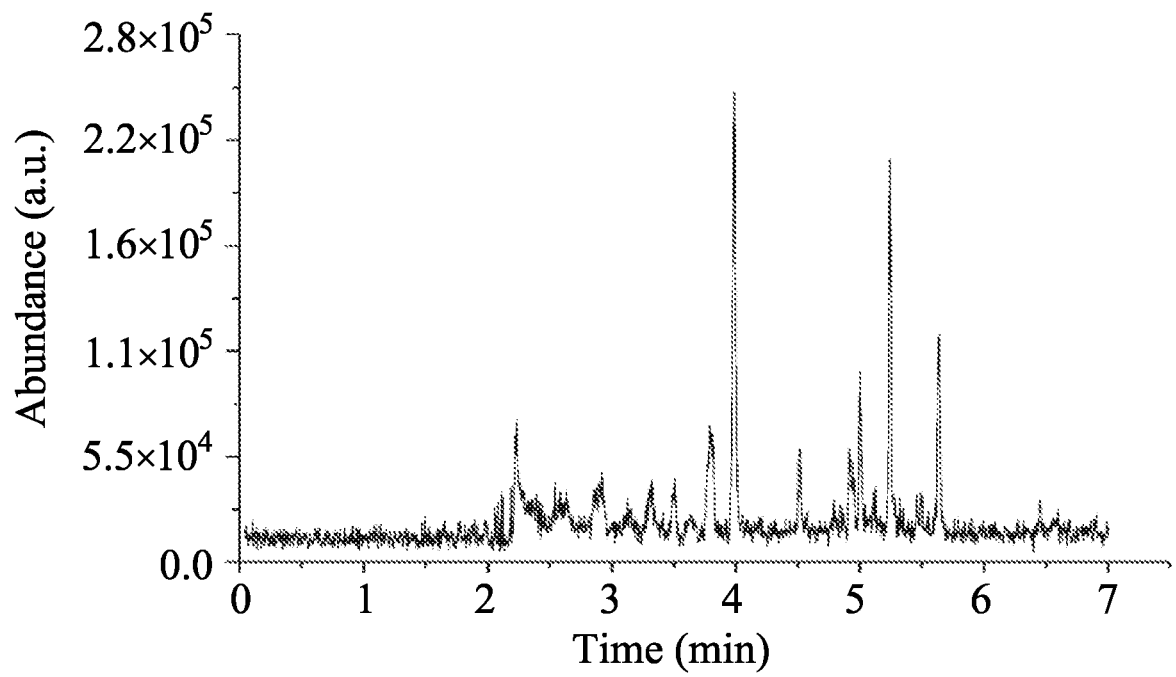
FIG. 20A is a chromatogram according to Example 14 of the present disclosure.
Figure 20B:
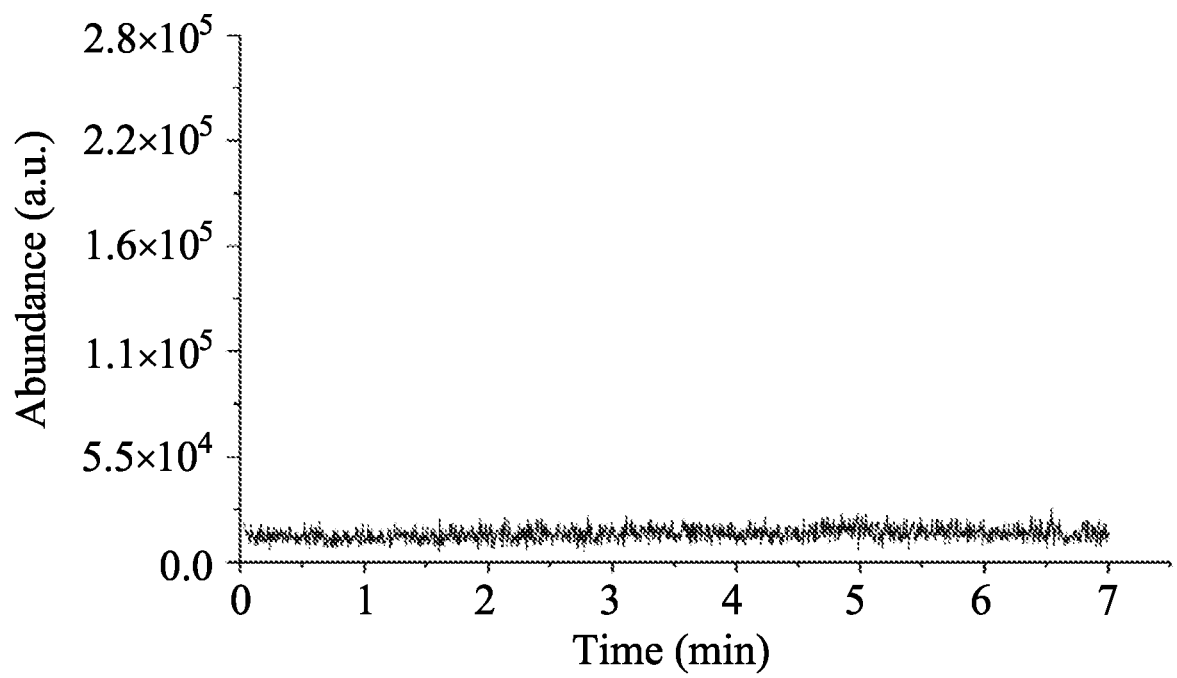
FIG. 20B is a chromatogram according to Comparative Example 14 of the present disclosure.

3.2 Effervescent Tablet for Extraction of Volatile Organic Compounds in Real Sample Please refer to FIGS. 16A, 16B, 17A, 17B, 18A, 18B, 19A, 19B, 20A and 20B. FIG. 16A is a chromatogram according to Example 10 of the present disclosure. FIG. 16B is a chromatogram according to Comparative Example 10 of the present disclosure. FIG. 17A is a chromatogram according to Example 11 of the present disclosure. FIG. 17B is a chromatogram according to Comparative Example 11 of the present disclosure. FIG. 18A is a chromatogram according to Example 12 of the present disclosure. FIG. 18B is a chromatogram according to Comparative Example 12 of the present disclosure. FIG. 19A is a chromatogram according to Example 13 of the present disclosure. FIG. 19B is a chromatogram according to Comparative Example 13 of the present disclosure. FIG. 20A is a chromatogram according to Example 14 of the present disclosure. FIG. 20B is a chromatogram according to Comparative Example 14 of the present disclosure.

Example 10 of the present disclosure involves analysis of 500 µL yogurt diluted to 2 mL with pure water as the liquid matrix, and performing the step 530 to the step 540 of the method for extracting and detecting volatile organic compounds 500 in FIG. 5. As shown in FIG. 16A and FIG. 16B, when the effervescent tablet is added, and reacts with the liquid matrix of Example 10, the volatile organic compounds are detected from the second detection instrument. Numerous peaks, corresponding to the volatile organic compounds, are seen in FIG. 16A, including ethyl acetate (EA), ethyl propionate (EP), ethyl butyrate (EB), ethyl hexanoate (EHX) and other volatile organic compounds. Furthermore, Comparative Example 10 involves the same procedure as Example 10 but without the effervescent tablet, and the volatile organic compounds in Comparative Example 10 are not extracted from the liquid matrix, so the corresponding peaks are not seen in FIG. 16B.

Example 11 of the present disclosure involves analysis of 200 µL aloe vera face mist diluted to 2 mL with pure water as the liquid matrix, and performing the step 530 to the step 540 of the method for extracting and detecting volatile organic compounds 500 in FIG. 5. As shown in FIG. 17A and FIG. 17B, when the effervescent tablet is added, and reacts with the liquid matrix of Example 11, the volatile organic compounds are detected from the second detection instrument. Numerous peaks, corresponding to the volatile organic compounds, are seen in FIG. 17A, including linalool and other volatile organic compounds. Furthermore, Comparative Example 11 involves the same procedure of Example 11 but without the effervescent tablet, and the volatile organic compounds in Comparative Example 11 are not extracted from the liquid matrix, so the corresponding peaks are not seen in FIG. 17B.

Example 12 of the present disclosure involves analysis of 500 µL wine diluted to 2 mL with pure water as the liquid matrix, and performing the step 530 to the step 540 of the method for extracting and detecting volatile organic compounds 500 in FIG. 5. As shown in FIG. 18A and FIG. 18B, when the effervescent tablet is added, and reacts with the liquid matrix of Example 12, the volatile organic compounds are detected from the second detection instrument. Numerous peaks corresponding to the volatile organic compounds are seen in FIG. 18A, including ethyl acetate (EA), ethyl propionate (EP), ethyl butyrate (EB) ethyl hexanoate (EHX), ethyl octanoate (EO) and other volatile organic compounds. Furthermore, Comparative Example 12 involves the same procedure as Example 12 but without the effervescent tablet, and the volatile organic compounds in Comparative Example 12 are not extracted from the liquid matrix, so the corresponding peaks are not seen in FIG. 18B.

Example 13 of the present disclosure involves analysis of 500 µL mango juice diluted to 2 mL with pure water as the liquid matrix, and performing the step 530 to the step 540 of the method for extracting and detecting volatile organic compounds 500 in FIG. 5. As shown in FIG. 19A and FIG. 19B, when the effervescent tablet is added, and reacts with the liquid matrix of Example 13, the volatile organic compounds are detected from the second detection instrument. Numerous peaks, corresponding to the volatile organic compounds, are seen in FIG. 19A, including myrcene and other volatile organic compounds. Furthermore, Comparative Example 13 involves the same procedure as Example 13 but without the effervescent tablet, and the volatile organic compounds in Comparative Example 13 are not extracted from the liquid matrix, so the corresponding peaks are not seen in FIG. 19B.

Example 14 of the present disclosure involves analysis of 500 μL strawberry smoothie diluted to 2 mL with pure water as the liquid matrix, and performing the step 530 to the step 540 of the method for extracting and detecting volatile organic compounds 500 in FIG. 5. As shown in FIG. 20A and FIG. 20B, when the effervescent tablet is added, and reacts with the liquid matrix of Example 14, the volatile organic compounds are detected from the second detection instrument. Numerous peaks, corresponding to the volatile organic compounds, are seen in FIG. 20A. Furthermore, Comparative Example 14 involves the same procedure as Example 14 but without the effervescent tablet, and the volatile organic compounds in Comparative Example 14 are not extracted from the liquid matrix, so the corresponding peaks are not seen in FIG. 20B.

Therefore, the results of the present disclosure indicate that the effervescent tablet assists the extraction of the volatile organic compounds from the liquid matrix to the gas phase, and facilitates the transfer to the detection instrument, and detecting the volatile organic compounds in the liquid matrix. Therefore, the technique of the present disclosure can be applied in food, clinical, cosmetics and environmental analysis to detect the volatile organic compounds.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for extracting and detecting volatile organic compounds, comprising:
    providing at least one effervescent tablet, wherein the at least one effervescent tablet is produced by mixing an acidic compound and an alkaline compound homogeneously, and adding a metallic substance;
    providing an extraction and detection apparatus, wherein the extraction and detection apparatus comprises an extraction chamber, an injection tube and a detection instrument, and the extraction chamber is connected with the detection instrument by the injection tube, wherein the extraction chamber further comprises a cap, and the cap comprises a hole for the injection tube to pass through;
    performing an extraction step, wherein a liquid matrix is put into the extraction chamber, and the at least one effervescent tablet is added into the liquid matrix to generate bubbles, the volatile organic compounds are extracted from the liquid matrix by gas present within the bubbles, and the bubbles enter into the headspace of the extraction chamber; and
    performing a detection step, wherein the volatile organic compounds extracted during the extraction step are transferred to the detection instrument via the injection tube, so as to detect the volatile organic compounds,
    wherein the extraction step further comprises:
    positioning the at least one effervescent tablet, containing the metallic substance, by a magnet, so as to hold the at least one effervescent tablet inside the cap; and
    removing the magnet for dropping the at least one effervescent tablet into the extraction chamber to react with the liquid matrix, so as to generate the bubbles.

2. The method for extracting and detecting volatile organic compounds of claim 1, wherein the detection step comprises:
    transferring the volatile organic compounds extracted from the extraction step to a first detection instrument via the injection tube, so as to detect the volatile organic compounds, wherein the first detection instrument is a mass spectrometer.

* * * * *